(12) United States Patent
Driemeyer et al.

(10) Patent No.: US 8,660,946 B2
(45) Date of Patent: Feb. 25, 2014

(54) APPARATUSES, METHODS AND SYSTEMS FOR A TRACKABLE VIRTUAL CURRENCIES PLATFORM

(71) Applicants: Justin Driemeyer, San Francisco, CA (US); Matthew Ocko, San Francisco, CA (US)

(72) Inventors: Justin Driemeyer, San Francisco, CA (US); Matthew Ocko, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/655,398

(22) Filed: Oct. 18, 2012

(65) Prior Publication Data

US 2013/0046684 A1    Feb. 21, 2013

Related U.S. Application Data

(63) Continuation of application No. 13/244,695, filed on Sep. 26, 2011, now Pat. No. 8,315,944, which is a continuation of application No. 12/895,723, filed on Sep. 30, 2010, now Pat. No. 8,326,751.

(60) Provisional application No. 61/247,558, filed on Sep. 30, 2009.

(51) Int. Cl.
*G06Q 40/00* (2012.01)

(52) U.S. Cl.
USPC ............... 705/39; 705/35; 705/36 R; 705/37; 705/38

(58) Field of Classification Search
CPC ...................................................... G06Q 40/00
USPC ....................................................... 705/35–39
See application file for complete search history.

(56) References Cited

U.S. PATENT DOCUMENTS

| | | | |
|---|---|---|---|
| 5,889,862 A * | 3/1999 | Ohta et al. | 705/69 |
| 6,601,048 B1 * | 7/2003 | Gavan et al. | 706/10 |
| 7,458,508 B1 * | 12/2008 | Shao et al. | 235/380 |
| 7,562,814 B1 * | 7/2009 | Shao et al. | 235/380 |
| 7,657,497 B2 * | 2/2010 | Nandy | 706/45 |
| 7,686,214 B1 * | 3/2010 | Shao et al. | 235/380 |
| 7,793,835 B1 * | 9/2010 | Coggeshall et al. | 235/380 |
| 7,908,645 B2 * | 3/2011 | Varghese et al. | 726/4 |
| 8,082,349 B1 * | 12/2011 | Bhargava et al. | 709/227 |
| 8,245,282 B1 * | 8/2012 | Buckwalter et al. | 726/4 |
| 8,312,276 B2 * | 11/2012 | Chiou et al. | 713/171 |
| 8,412,605 B2 * | 4/2013 | Griffin et al. | 705/35 |
| 2002/0099649 A1 * | 7/2002 | Lee et al. | 705/38 |
| 2006/0149674 A1 * | 7/2006 | Cook et al. | 705/44 |
| 2006/0253358 A1 * | 11/2006 | Delgrosso et al. | 705/35 |
| 2006/0282660 A1 * | 12/2006 | Varghese et al. | 713/155 |
| 2007/0174214 A1 * | 7/2007 | Welsh et al. | 705/405 |
| 2007/0299775 A1 * | 12/2007 | Algiene | 705/45 |

(Continued)

OTHER PUBLICATIONS

Business Wire SAS Offers New Fraud Framework Featuring SAS [R] Social Network Analysis, Mar. 23, 2009, pp. 1-4.*

*Primary Examiner* — Narayanswamy Subramanian
(74) *Attorney, Agent, or Firm* — Martine Penilla Group, LLP

(57) ABSTRACT

Method for detecting fraud includes receiving a fraud alert. The fraud alert is investigated by analyzing social graph information and other available information of one or more users associated with the fraud alert to determine likelihood of the users being involved in fraud. When it is determined that a fraud was committed based on the analysis, chain of fraudulent transactions related to the fraud are reversed and fraud events data related to the fraud are updated into a fraud event database for subsequent analysis.

15 Claims, 11 Drawing Sheets

EXEMPLARY FRAUD DETERMINATION

(56) References Cited

U.S. PATENT DOCUMENTS

| | | | |
|---|---|---|---|
| 2008/0010678 A1* | 1/2008 | Burdette et al. | 726/15 |
| 2008/0046334 A1* | 2/2008 | Lee et al. | 705/26 |
| 2008/0140576 A1* | 6/2008 | Lewis et al. | 705/67 |
| 2008/0172257 A1* | 7/2008 | Bisker et al. | 705/4 |
| 2008/0270171 A1* | 10/2008 | Price et al. | 705/1 |
| 2008/0270303 A1* | 10/2008 | Zhou et al. | 705/44 |
| 2008/0288382 A1* | 11/2008 | Smith et al. | 705/35 |
| 2009/0094669 A1* | 4/2009 | Savadi et al. | 726/1 |
| 2009/0198562 A1* | 8/2009 | Wiesinger et al. | 705/10 |
| 2009/0222369 A1* | 9/2009 | Zoldi et al. | 705/35 |
| 2009/0248434 A1* | 10/2009 | Pfeffer et al. | 705/1 |
| 2009/0265198 A1* | 10/2009 | Lester et al. | 705/7 |
| 2010/0114617 A1* | 5/2010 | Bobbitt et al. | 705/7 |
| 2010/0145771 A1* | 6/2010 | Fligler et al. | 705/10 |
| 2010/0228580 A1* | 9/2010 | Zoldi et al. | 705/7 |
| 2011/0055074 A1* | 3/2011 | Chen et al. | 705/39 |
| 2011/0125574 A1* | 5/2011 | Pfeffer et al. | 705/14.49 |

* cited by examiner

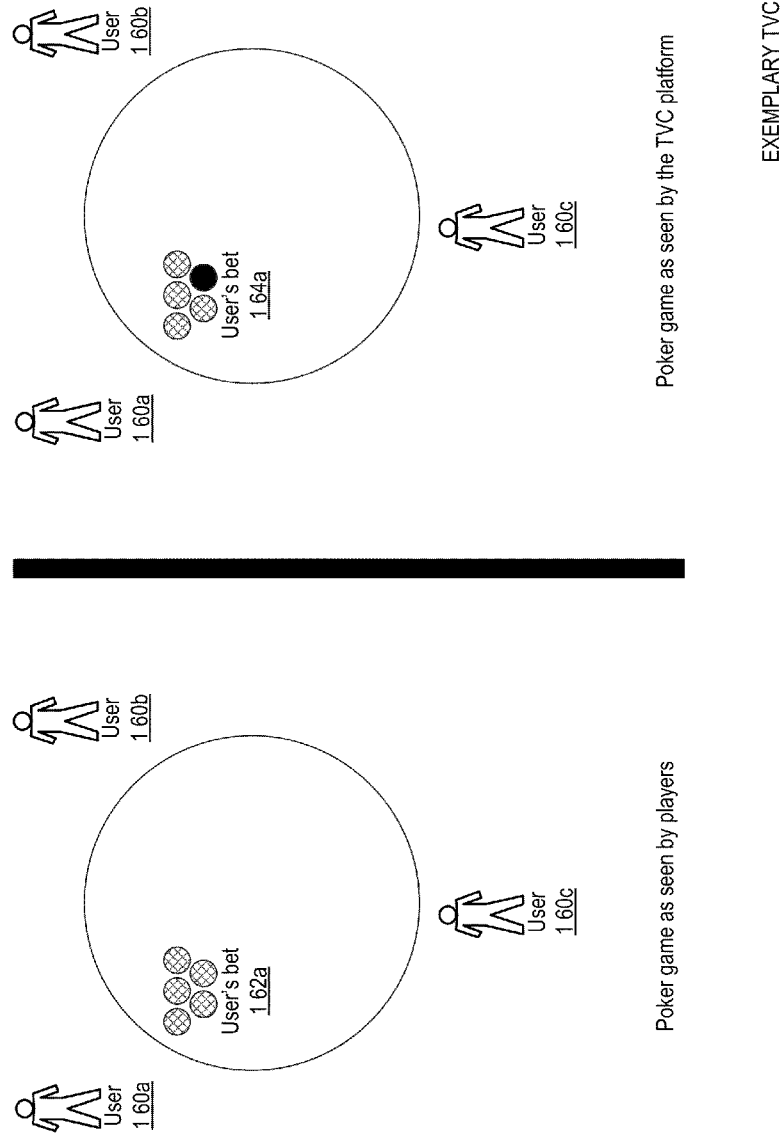

EXEMPLARY TVC POTENTIAL FRAUD EVENT DETECTION DATA FLOW

US 8,660,946 B2

APPARATUSES, METHODS AND SYSTEMS FOR A TRACKABLE VIRTUAL CURRENCIES PLATFORM

CLAIM OF PRIORITY

This application claims priority as a continuation, under 35 USC §120, of U.S. patent application Ser. No. 13/244,695, entitled "APPARATUSES, METHODS AND SYSTEMS FOR A TRACKABLE VIRTUAL CURRENCIES PLATFORM," filed on Sep. 26, 2011, which is a continuation of U.S. patent application Ser. No. 12/895,723 entitled "APPARATUSES, METHODS AND SYSTEMS FOR A TRACKABLE VIRTUAL CURRENCIES PLATFORM," filed on Sep. 30, 2010, which claims benefit, under 35 USC §119, of U.S. Provisional Patent Application No. 61/247,558, filed on Sep. 30, 2009, and entitled "TRACKABLE VIRTUAL CURRENCIES," which are all hereby incorporated by reference.

CROSS REFERENCE TO RELATED APPLICATIONS

For additional teachings of various uses of social graphs, see U.S. provisional patent application Ser. No. 61/179,345 filed May 19, 2009, entitled "DIRECT EMBEDDING OF GAMES INTO THIRD PARTY WEBSITES," and U.S. patent application Ser. No. 12/778,956 filed May 12, 2010, entitled "EMBEDDING OF GAMES INTO THIRD PARTY WEBSITES."

The entire contents of the aforementioned applications are herein expressly incorporated by reference.

FIELD OF THE INVENTION

The present invention is directed generally to apparatuses, methods and systems of currency tracking, and more particularly, to APPARATUSES, METHODS AND SYSTEMS FOR A TRACKABLE VIRTUAL CURRENCIES PLATFORM.

BACKGROUND

Various applications that allow Internet users to interact with other users online have become popular. Online games that allow players to interact with other players are one type of such online applications. Some online games, such as chess or bridge, have a small number of players that play together at the same time. Other online games, such as massively multiplayer online games, can have a large number of users playing together at once. Many online games use in-game currencies that may be used as part of the game (e.g. betting currency in card games) or to purchase various in-game items.

SUMMARY

The APPARATUSES, METHODS AND SYSTEMS FOR A TRACKABLE VIRTUAL CURRENCIES PLATFORM (hereinafter "TVC") transform user transaction request input via various TVC components into transaction result output.

In one embodiment, a fraud detection method implemented by a processor is disclosed. The method includes receiving a fraud alert. The fraud alert is investigated by analyzing social graph information and other available information of one or more users associated with the fraud alert to determine likelihood of the users being involved in fraud. When it is determined that a fraud was committed based on the analysis, a chain of fraudulent transactions related to the fraud is reversed and fraud events data related to the fraud is updated into a fraud event database for subsequent analysis.

In another embodiment, a system for detecting fraud in an online gaming application is disclosed. The system includes a memory and a processor in communication with the memory. The processor is configured to issue processing instructions stored in the memory. The processor issues instructions to receive a fraud alert; investigate the fraud alert by analyzing social graph information and other available information of one or more users associated with the fraud alert to determine likelihood of the users being involved in a fraud. When it is determined that a fraud was committed based on the analysis, the processor issues instructions to reverse a chain of fraudulent transactions related to the fraud and to update fraud events data related to the fraud into a fraud event database for subsequent analysis.

In yet another embodiment, a processor-readable tangible medium storing processor-issuable instructions for detecting fraud in an online gaming application is disclosed. The instructions are configured to receive a fraud alert; investigate the fraud alert by analyzing social graph information and other available information of one or more users associated with the fraud alert to determine likelihood of the users being involved in a fraud. When it is determined that a fraud was committed based on the analysis, the instructions are configured to reverse a chain of fraudulent transactions related to the fraud and update fraud events data related to the fraud into a fraud event database for subsequent analysis.

BRIEF DESCRIPTION OF THE DRAWINGS

The accompanying appendices and/or drawings illustrate various non limiting, example, inventive aspects in accordance with the present disclosure:

FIG. 1B is of an exemplary use case in one embodiment of the TVC platform;

Figure 1A:
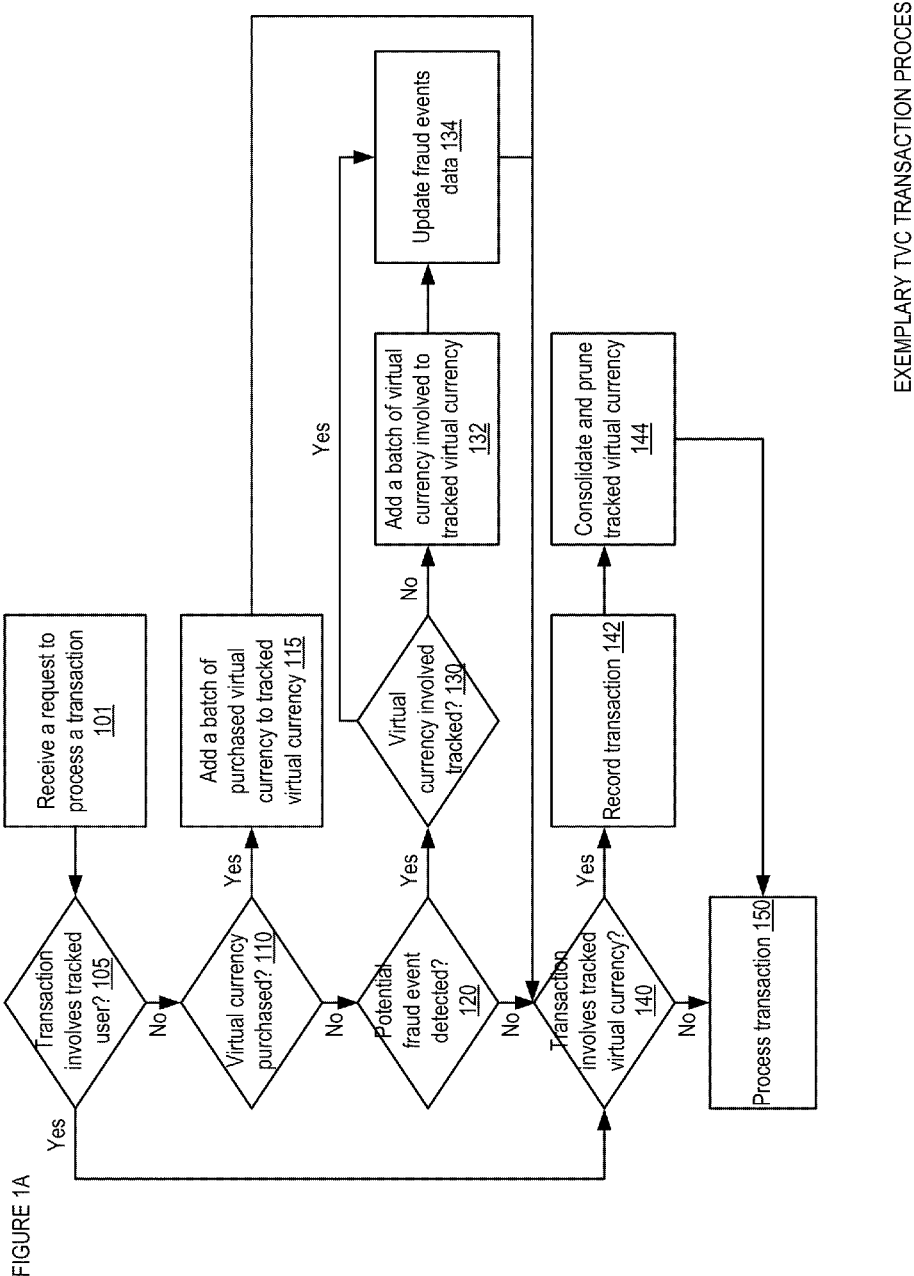
FIG. 1A is of a logic flow diagram illustrating transaction processing in one embodiment of the TVC platform.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Overview

Online game operators provide users an opportunity to play online games together with their friends. Particularly, social game operators harness online social networks, designing games that closely integrate the social graph data of users and their existing friendship connections. One of the concerns faced by online game operators is fraud that may be committed by users. Fraud may take on a variety of forms. For example, several users may collude in a game of poker to increase their chances of winning and defraud other users. In another example, users may conduct transactions outside of a game and exchange in-game items and/or virtual currency for real money in violation of game rules. To combat fraud, online game operators may use social graph information associated with users to determine whether a user is likely to commit fraud. For example, a user with a lot of friends in the user's social graph may be more likely to be a real person playing a game, while a user with few friends in the user's social graph may be more likely to be a made up persona created to commit fraud.

In one embodiment, social graph information may describe a user's friends. For example, user Alice may be a friend of user Bob, implying that Alice and Bob are related in some way. In one implementation, the relationship can be explicit, such as a relationship stored in a social network database that links Alice's user record to Bob's user record (e.g., a relationship database table in the Social Graph table group 1019*b*). For example, Alice and Bob may be listed as friends in a social network database because one or both of them set up the explicit connection. In another implementation, the relationship may be implicit in that the TVC platform determines, based on data available to it (e.g., data regarding transactions stored in the Transaction table group 1019*c*), that a relationship exists between Alice and Bob that can be deemed a friend relationship. For example, the TVC platform may include logic to track which users play together, note repeat linkings and infer a friend relationship. In one embodiment, determining friend relationships might involve a plurality of social graphs. For example, friends could be identified by relationships in a social graph set up by a company operating a social networking site and/or social graphs set up by an online game company. In one embodiment, social graphs can be multiple levels (e.g., there are friends of friends), and in some contexts, friends of friends are treated as friends (and that itself could be recursive). In one embodiment, social graphs may be unidirectional or bidirectional and different types of links may optionally be given different weights (e.g., explicit links may be given a weight of W, implicit links may be given a weight of W/2, and mutual links may be given a weight of 2W).

TVC

FIG. 1A is of a logic flow diagram illustrating transaction processing in one embodiment of the TVC platform. In FIG. 1A, a request to process a transaction is received 101. A transaction may include any of a variety of events that involve potential transfer of virtual currency. For example, transactions may include betting virtual currency in a game of poker, purchasing virtual currency from a game operator, listing or purchasing in-game items in a market or auction, gifting virtual currency to another player, and/or the like. In one embodiment, transaction details may be included in a data structure included as part of the request. For example, the data structure may be passed in as an argument to a function written in the PHP programming language (e.g., the data structure may include a variety of fields such as the unique ID (UID) for a user involved in the transaction, the type of transaction, and/or the like).

At 105, a determination may be made whether the transaction involves a user that is being tracked. In one embodiment, data in the User table group 1019*a* may be checked to make this determination. In one implementation, this check may be performed by checking the value of a field retrieved using a SQL statement (e.g., SELECT Tracked FROM UserInfo WHERE UID='UID for a user–from the transaction details data structure'). In one embodiment, the transaction may involve a single user, and the check may be performed on that user. In another embodiment, the transaction may involve multiple users, and the check may be performed on only one user (e.g. the initiator of the transaction, the recipient of the virtual currency, etc.) or on multiple users associated with the transaction (e.g., some or all of the users involved in the transaction). An indication that a user is tracked may signify that a user is associated with an elevated level of risk of fraud. Accordingly, in one embodiment, transactions that involve a tracked user may be monitored using tracked virtual currency, and the determination whether a transaction involves tracked virtual currency at 140 would be affirmative for a tracked user.

If the transaction does not involve a user that is being tracked, at 110 a determination may be made whether the transaction involves the purchase of virtual currency. See FIG. 4 for additional details regarding purchasing virtual currency. In one embodiment, if a transaction involves the purchase of virtual currency, a batch of purchased virtual currency is added to tracked virtual currency at 115, and the determination whether a transaction involves tracked virtual currency at 140 would be affirmative. In another embodiment, only some transactions that involve the purchase of virtual currency (e.g., transaction involving an amount of virtual currency or real currency above a predetermined threshold) may involve adding a batch of tracked virtual currency to purchased virtual currency. See FIG. 7 for additional details regarding tracking purchased virtual currency using tracked virtual currency.

If the determination at 110 is negative, the transaction does not involve a purchase of virtual currency. Instead, the transaction may involve a transfer of virtual currency (e.g., betting virtual currency, purchasing an in-game item in a market, gifting virtual currency to another player, etc.). At 120, a determination may be made whether the transaction is a potential fraud event. In one embodiment, a determination that a transaction is a potential fraud event may indicate that while the transaction is not necessarily fraudulent, the transaction has an elevated risk of being fraudulent. In one implementation, this determination may be made based on the nature of the transaction, and previous historical data and social graph information associated with transaction participants. See FIGS. 5 and 6 for additional details regarding determining whether a transaction is a potential fraud event.

If the transaction is classified as a potential fraud event, a determination may be made at 130 whether the transaction involves tracked virtual currency. For example, if a transaction participant places a poker bet using virtual currency that is tracked, the transaction would involve tracked virtual currency. In one embodiment, a transaction classified as a potential fraud event is tracked using tracked virtual currency, and if the transaction does not already involve tracked virtual currency, a new batch of the virtual currency involved in the transaction is added to tracked virtual currency at 132. See FIG. 7 for additional details regarding tracking virtual currency using tracked virtual currency.

At 134, information regarding the potential fraud event may be recorded. In one embodiment, the Fraud Event table group 1019d is updated with information regarding the potential fraud event. For example, such information may include a UID for the potential fraud event, the type of the transaction (e.g., betting virtual currency), transaction details (e.g., virtual currency bet was placed by user1 and won by user2), transaction participants (e.g., players playing at the poker table), a transaction fraud score (in one implementation calculated at 120), UIDs of the tracked virtual currency batches associated with the transaction, date, time, and/or the like. In one implementation, transaction details may be retrieved from the transaction details data structure using PHP and the Fraud Event table group 1019d may be updated using SQL statements:

```
<?php
function updateFraudEvents($transactionDetails, ...)
{
    $FraudEventUID = $transactionDetails["FraudEventUID"];
    ...
    $query = "INSERT INTO FraudEventsTable VALUES
    ($FraudEventUID,
    $TransactionUID, $TransactionParticipants,
    $TrackedCurrencyBatchUID)";
    $result = mysql_query($query);
    ...
}
?>
```

At 140, a determination may be made whether the transaction involves tracked virtual currency. If the transaction does not involve tracked virtual currency, the transaction may be processed at 150. For example, a transaction that involves a user who purchases a tractor appropriate to the user's in-game level using virtual currency that is not tracked may be processed to add the tractor to the user's inventory. If the transaction involves tracked virtual currency, the transaction may be recorded at 142. For example, a transaction that involves a user who purchases virtual currency may involve tracked virtual currency. The transaction may be logged for future auditing and the tracked virtual currency may be associated with the user. See FIG. 8 for additional details regarding recording transactions.

In one embodiment, tracked virtual currency associated with a user may be consolidated and/or pruned to optimize virtual currency tracking at 144. In one implementation, tracked virtual currency batches below a threshold size, tracked virtual currency batches that are too numerous, tracked virtual currency batches that have expired, and/or the like may be consolidated and/or pruned. See FIG. 9 for additional details regarding consolidating and pruning tracked virtual currency batches.

FIG. 1B is of an exemplary use case in one embodiment of the TVC platform. FIG. 1B illustrates how users playing a game of poker may view a bet compared to how the TVC platform may view the bet, in one embodiment. In FIG. 1B, users 160a-c may be playing poker together (e.g., at a poker table in Zynga Poker). For example, player 160a may place a bet of virtual currency 162a (e.g., 5 chips). From the point of view of the users 160a-c, user 160a bet ordinary virtual currency. In one embodiment, the TVC platform may use tracked virtual currency to track the bet of virtual currency 162a made by player 160a. In one implementation, some proportion (e.g., 20%, 1 chip, and/or the like) of the bet may be used as tracked virtual currency and may be seen by the TVC platform as illustrated at 164a. For example, tracked virtual currency may have a unique ID and may be used by the TVC platform to track transactions and to detect potential and/or actual fraud.

Figure 2:
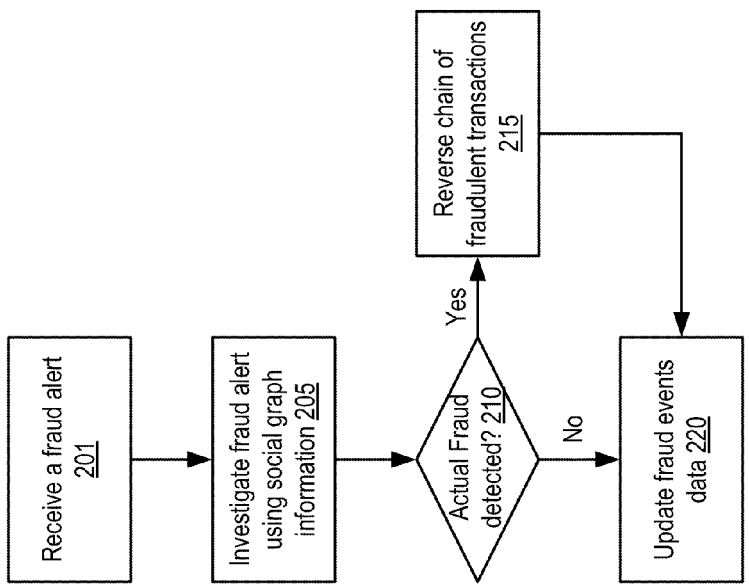
FIG. 2 is of a logic flow diagram illustrating fraud determination in one embodiment of the TVC platform.

FIG. 2 is of a logic flow diagram illustrating fraud determination in one embodiment of the TVC platform. In FIG. 2, a fraud alert is received at 201. In one embodiment, the fraud alert may be received from a user. For example, the user may send a "my account was hacked" message to customer support, call customer support via a telephone, and/or the like. In another embodiment, the alert may be generated by the TVC platform. For example, if a metric of potential fraud associated with a transaction and/or with a user exceeds a threshold, the TVC platform may generate a fraud alert.

At 205, the fraud alert may be investigated using social graph information and/or other available information. For example, social graph information of users associated with the fraud alert may be analyzed to determine the likelihood of the users being involved in fraud. In one embodiment, social graph information of a user who claims to be a victim of fraud may be analyzed to determine whether the user is likely to submit a false claim. For example, the user's social graph may be analyzed to determine whether the user's account is associated with other users who have submitted false claims, and/or committed fraud, and/or are associated with many potential fraud events. In one implementation, weights associated with different types of links may be used in the analysis to determine how closely the user is linked with other users. If the user's friends have committed fraud and/or are associated with many potential fraud events, the user may be more likely to commit fraud as well. In one implementation, social graph data associated with the user may be retrieved for analysis from the Social Graph table group 1019b. In another implementation, social graph data may be retrieved by sending a request to a third party social network such as Facebook, MySpace, etc. (e.g., using a callback URL that includes the UID of the user or using the social network's API). In another embodiment, social graph information of users who received the virtual currency associated with the fraud alert may be analyzed to determine whether the users are likely to be involved in fraud. For example, the users' social graphs may be analyzed to determine whether the users' friends have previously committed fraud and/or are associated with many potential fraud events. If a user's friends have committed fraud and/or are associated with many potential fraud events, the user may be more likely to commit fraud. In one implementation, data regarding previous actual fraud and/or potential fraud events associated with a user may be retrieved from the Fraud Event table group 1019d. In yet another embodiment, social graph information of users associated with the fraud alert may be analyzed to determine the likelihood that the users committed fraud based on their behavior. For example, if a first user gifts or sells a high value item to a second user for a very low price, the gift may be a result of the two users being friends or it may be a result of an external transaction for real money (e.g., the second user paid to the first user to acquire the item, in violation of game rules). The social graph information associated with the two users may be analyzed to determine whether the two users are friends or strangers (e.g., based on the number of interactions the two users have had with each other, and/or based on how recently the two users started associating with each other, and/or based on the weights associated with links). If the two users are strangers, they may be more likely to have committed fraud. In another example, if a high-level user loses a game to a low level user, this may be a result of losing illegitimately (e.g., a thrown game). The social graph information associated with the two users may be analyzed to determine whether the two users are friends or strangers. If the two users are friends, they may be more likely to have committed fraud. In yet another embodiment, information regarding virtual currency used to purchase an item (e.g., a tractor in Zynga Game Network's FarmVille) may be analyzed to determine the likelihood that fraud was committed. In one implementation, tracked virtual currency may be associated with the purchased item (e.g., the tractor may be cryptographically signed with the UID of a tracked virtual currency batch used to purchase the tractor). For example, if a fraud alert from a user indicates that the user's virtual currency disappeared, information regarding the user's transactions may be examined to determine how the money was spent (e.g., to buy the tractor), and whether it is likely that fraud was committed (e.g., if the user does not have the tractor, but some other user who is not the user's friend does, the other user may have committed fraud). In another example, if a fraud alert from a user indicates that the user's item disappeared (e.g., the user's tractor disappeared), tracked virtual currency associated with the user may be examined to determine whether it was used to pay for the item (e.g., if tracked virtual currency that was used to pay for the tractor is now associated with the user, the user may have submitted a false fraud alert). In one embodiment, social graph information of users associated with the fraud alert may be analyzed according to predetermined rules (e.g. rules following the examples discussed above) to calculate a score signifying the likelihood that a user has committed fraud. For example, rules may be applied and a score for each applied rule may be calculated (e.g., 1=high likelihood and 0=low likelihood that a user has committed fraud) and a weighted average (e.g., based on predetermined weights) may be calculated to determine the score signifying the likelihood that a user has committed fraud.

At 210, a determination may be made whether fraud was committed. In one embodiment, the TVC platform may make the determination, the TVC platform may compare the score signifying the likelihood that a user has committed fraud to a predetermined threshold value and determine that the user has committed fraud if the score exceeds the threshold value. In another embodiment, the analysis performed at 205 may be evaluated (e.g., by an operator, via a neural network, etc.) to determine whether fraud was committed.

If fraud was committed, the chain of fraudulent transactions may be reversed at 215. In one embodiment, information regarding the transactions that resulted in fraud may be used. In one implementation, these transaction may be found based on information in the Transaction table group 1019c (e.g., transaction details), and/or information in the User table group 1019a (e.g., tracked virtual currency associated with users), and/or information in the Fraud Event table group 1019d (e.g., potential fraud events associated with users). For example, if user two defrauded user one (fraudulent transaction one) and gifted the illegitimately obtained virtual currency to user three (fraudulent transaction two), transaction details associated with fraudulent transaction one may be examined to determine tracked virtual currency that was transferred from user one to user two, and virtual currency may be tracked to user three by following the transfer of tracked virtual currency in fraudulent transaction two. In one embodiment, virtual currency may be restored to the defrauded user, and the chain of transactions may be reversed. In another embodiment, virtual currency may be restored to the defrauded user using new virtual currency and the tracked virtual currency that was part of the fraud may be removed from circulation.

Fraud events data may be updated at 220. In one embodiment, fraud events data may be updated to reflect whether the fraud alert was associated with actual fraud or whether the fraud alert was a false alarm. In one implementation, if the fraud alert was associated with actual fraud, information regarding the transaction may be recorded. For example, a database table of the Fraud Event table group 1019d containing information regarding actual fraud may be updated via a SQL statement (e.g., INSERT INTO ActualFraudTable VALUES ('actual fraud UID', 'transaction UID')). In one implementation, if the fraud alert was a false alarm, information regarding the transaction may be removed from the list of potential fraud events. For example, the Fraud Event table group 1019d may be updated via a SQL statement (e.g. DELETE FROM FraudEventsTable WHERE transaction_UID='UID of the transaction').

Figure 3:
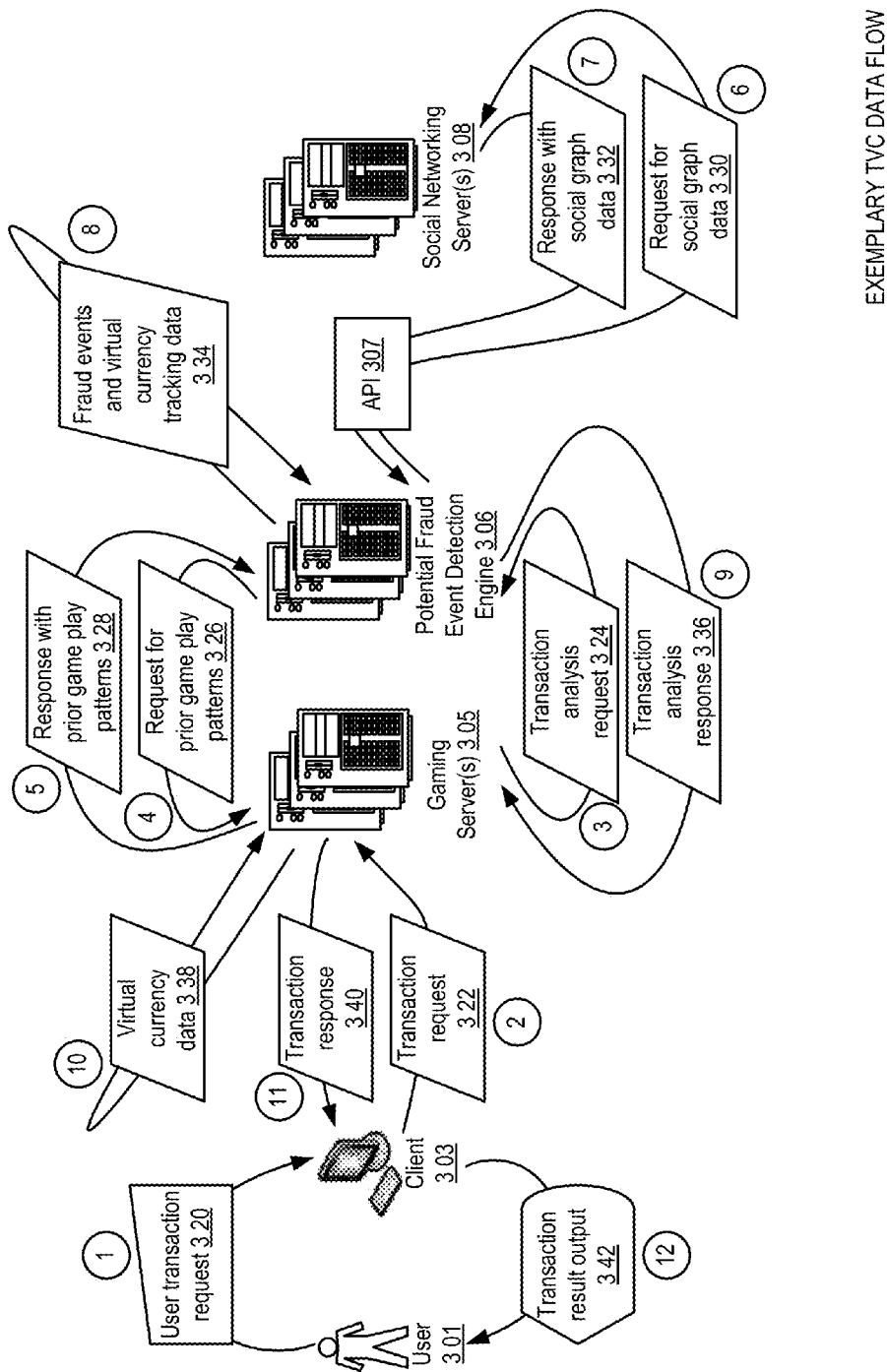
FIG. 3 illustrates data flow in one embodiment of the TVC platform.

FIG. 3 illustrates data flow in one embodiment of the TVC platform. In FIG. 3, a user 301 may send a user transaction request 320 to a client 303. In one embodiment, the user request may be a request to modify a user's account based on a transaction involving virtual currency (e.g., see FIG. 1A and related figures). For example, the user may wish to purchase virtual currency (e.g., Reward Points in Zynga Game Network's Mafia Wars game). In another example, the user may place a bet in a hand of poker. In one implementation, the user may use a keyboard, a mouse, and/or the like to input the user transaction request 320 (e.g., using a user interface of a game). In one embodiment, the client 303 may send a transaction request 322 to a gaming server 305 (e.g., Zynga Game Network's Mafia Wars gaming server) to facilitate the transaction (e.g., a purchase of virtual currency). In one implementation, the transaction request 322 may include information regarding the transaction (e.g., user's UID, virtual currency type to be purchased, virtual currency amount to be purchased, and/or the like). For example, the transaction request may be in XML format and may take on the following form:

```
<XML>
    <UserUID>User1234</UserUID>
    <VCType>Reward Points</VCType>
    <VCAmount>100</VCAmount>
</XML>
```

Figure 5:
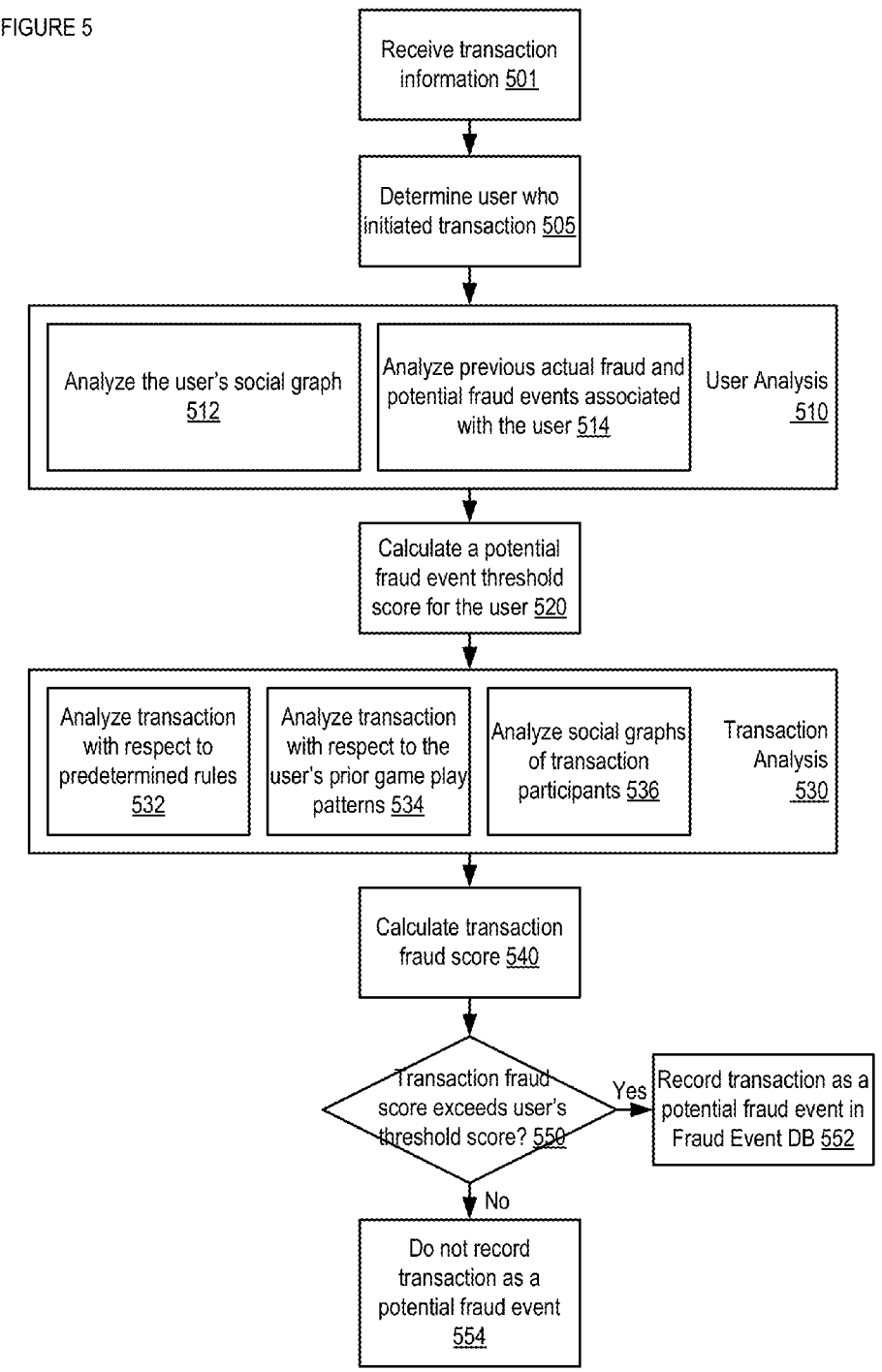
FIG. 5 is of a logic flow diagram illustrating a fraud event detection component in one embodiment of the TVC platform.

In one embodiment, the gaming server 305 may send a transaction analysis request 324 to a potential fraud event detection engine 306 (e.g., the fraud event detection component illustrated in FIG. 5). For example, the potential fraud event detection engine 306 may analyze the transaction to determine whether the transaction is potentially fraudulent. In one implementation, the gaming server 305 and the potential fraud event detection engine 306 may be the same server. In one embodiment (e.g., if the user is betting virtual currency in a hand of poker), the potential fraud event detection engine 306 may send a request for prior game play patterns 326 to the gaming server 305. For example, the request may be in XML format and may take on the following form:

```
<XML>
    <UserUID>User1234</UserUID>
    <TransactionUID>Transaction456</TransactionUID>
    <IncentiveUID>Incentive789</IncentiveUID>
</XML>
```

The gaming server 305 may respond to the potential fraud event detection engine 306 with prior game play patterns 328. In one implementation, the gaming server 305 may retrieve prior game play patterns from the User table group 1019a (e.g., see FIG. 1A and related figures). In another embodiment, the potential fraud event detection engine 306 may retrieve prior game play patterns without the help of the gaming server 305. For example, the potential fraud event detection engine 306 may retrieve prior game play patterns from the User table group 1019a (e.g., see FIG. 1A and related figures). In one implementation, prior game play patterns may be analyzed (e.g., see FIG. 1A and related figures) to help determine whether the transaction is potentially fraudulent. In one embodiment, the potential fraud event detection engine 306 may use an application programming interface (API) 307 to request social graph data from a social networking server 308 (e.g., Facebook, MySpace, and/or the like). In one implementation, the potential fraud event detection engine 306 may send a request for social graph data 330 to the social networking server 308 in accordance with the API 307, and receive a response with social graph data 332. In another implementation, social graph data may have been previously received (e.g., when the user signed up to play the game, during a periodic update, and/or the like) and the social graph data may be retrieved from the Social Graph table group 1019b (e.g., using one or more SQL statements). In one implementation, social graph data may be analyzed (e.g., see FIG. 1A and related figures) to help determine whether the transaction is potentially fraudulent. In one embodiment, the potential fraud event detection engine 306 may analyze data associated with the transaction 334. For example, the potential fraud event detection engine 306 may analyze data regarding actual fraud events, data regarding potential fraud events, virtual currency tracking data, and/or the like. In one implementation, this data may be retrieved from one or more table groups such as the User table group 1019a, the Fraud Event table group 1019d, and/or the like (e.g., using one or more SQL statements). In one implementation, this data may be analyzed (e.g., see FIG. 1A and related figures) to help determine whether the transaction is potentially fraudulent. In one embodiment the potential fraud event detection engine 306 may send a transaction analysis response 336 to the gaming server 305 indicating whether the transaction is potentially fraudulent (e.g., in XML format including the UID of the transaction, user, and/or the like). In one embodiment, virtual currency data 338 associated with the user may be updated (e.g., see FIG. 1A and related figures) to reflect the transaction. For example, virtual currency amount associated with the user may be updated so that if the user has 50 Reward Points and purchases 100 Reward Points, the amount of Reward Points in the user's account in Mafia Wars may be increased to 150. In another example, tracked virtual currency batches associated with the user may be updated (e.g., see FIG. 1A and related figures).

In one embodiment, the gaming server 305 may send a transaction response 340 to the client 303. In one implementation, the transaction response 340 may include information updated as a result of the transaction. For example, the transaction response may be in XML format and may take on the following form:

```
<XML>
    <UserUID>User1234</UserUID>
    <VCType>Reward Points</VCType>
    <VCAmount>150</VCAmount>
</XML>
```

In one embodiment, the client 303 may output the result of the transaction 342 to the user 301. In one implementation, the client 303 may output the result using a monitor, speakers, a printer, and/or the like. For example, the client 303 may update the user interface display to reflect that the user 301 owns 150 Reward Points as a result of the transaction.

Figure 4:
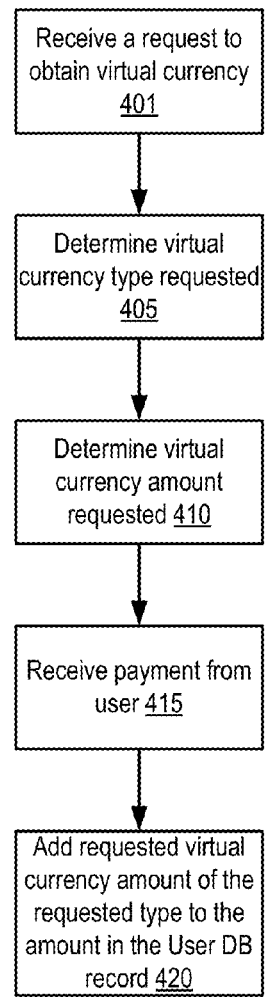
FIG. 4 is of a logic flow diagram illustrating a virtual currency purchase component in one embodiment of the TVC platform.

FIG. 4 is of a logic flow diagram illustrating a virtual currency purchase component in one embodiment of the TVC platform. In one embodiment, the virtual currency purchase component may be used to facilitate purchases of virtual currency. At 401, a request to obtain virtual currency may be received from a user. For example, a user may access a marketplace area of a game that accepts payment in exchange for virtual currency. As discussed with regard to FIG. 1A, in one embodiment, transaction details may be included in a data structure included as part of the request.

The type of the virtual currency requested by the user may be determined at 405 and the amount of the virtual currency requested by the user may be determined at 410. In one embodiment, this information may be determined by examining the transaction details data structure using PHP (e.g., $VCType=$transactionDetails["VCType"]; $VCAmount=$transactionDetails["VCAmount"];). In one embodiment, the type and/or amount of virtual currency purchased by the user may affect whether tracked virtual currency is used to track the purchased virtual currency. For example, the user may be able to purchase regular currency, which would not be tracked, and premium currency that has special characteristics, which would be tracked if the amount of the purchased premium currency exceeds a predetermined amount (e.g., the predetermined amount may be stored in a database).

At 415, payment for the purchased virtual currency is received from the user. In one embodiment, a predetermined conversion rate between real currency (e.g., dollars) and requested virtual currency type may be used to calculate the payment amount in real currency. For example, if the predetermined conversion rate between in game gold and dollars is 100 in-game gold pieces=$2, a purchase of 1000 in-game gold pieces would require a payment of 1000/100*2=$20. In one embodiment, a third party payment processor may be used to handle payment, and a confirmation from the third party payment processor (e.g., using a callback URL that includes the UID of the transaction) may indicate that the payment was received. The user's account may be credited with the purchased amount of the requested virtual currency type at 420. In one embodiment, data in the User table group 1019a may be updated to reflect the purchase using a SQL UPDATE statement.

Figure 6:
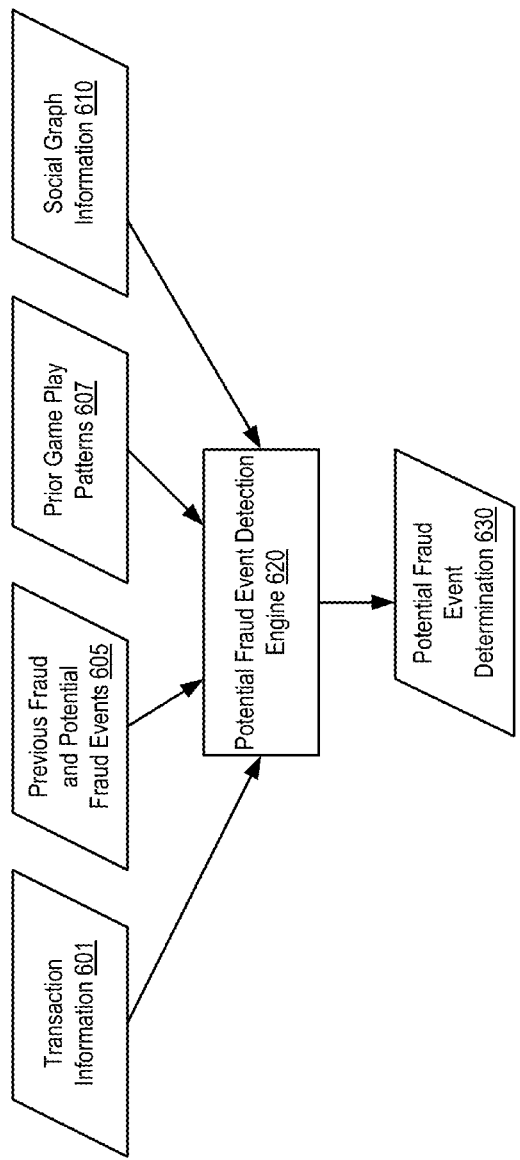
FIG. 6 illustrates potential fraud event detection data flow in one embodiment of the TVC platform.

FIG. 5 is of a logic flow diagram illustrating a fraud event detection component in one embodiment of the TVC platform, and FIG. 6 illustrates potential fraud event detection data flow in one embodiment of the TVC platform. As illustrated in FIG. 6, Transaction Information 601, Previous Fraud and Potential Fraud Events 605, Prior Game Play Patterns 607, and Social Graph Information 610 may be used by the Potential Fraud Event Detection Engine 620 to make the Potential Fraud Event Determination 630 regarding whether a transaction is a potential fraud event. In one embodiment, the Potential Fraud Event Detection Engine 620 may be the fraud event detection component illustrated in FIG. 5.

In FIG. 5, transaction information is received at 501. In one embodiment, transaction details may be received via a transaction details data structure (e.g., the transaction details data structure received as part of the request as described with regard to FIG. 1A). At 505, the user who initiated the transaction is determined. In one embodiment, this information may be determined by examining the transaction details data structure to determine the user's unique ID using PHP (e.g., $UserUID=$transactionDetails["UserUID"];).

Information regarding and associated with the user is analyzed at 510. In one embodiment, the information may be analyzed to determine the likelihood of the user being involved in a fraudulent transaction. In one implementation, the analysis may include analyzing the user's social graph 512 (e.g. user's friends in a social network, such as the user's mafia in Zynga Game Network's Mafia Wars game), and/or analyzing previous actual fraud and potential fraud events associated with the user 514.

In one embodiment, the user's social graph may be analyzed at 512 to determine whether the user's account is associated with a real person and is likely to be used to play a game, or with a made up persona and is likely to be used for fraud. In one implementation, this analysis may be performed based on the characteristics of the user's social graph. For example, the user's social graph may be analyzed to determine the number of friends in the user's social graph. A user with a lot of friends may be more likely to be a real person, while a user with few friends may be more likely to be a made up persona. In another example, the number of friends that the user's friends have in their social graph may be analyzed. If the user's friends have a lot of friends, they may be more likely to be real persons, and the user who is friends with real persons may be more likely to be a real person. On the other hand, if the user's friends have few friends, they may be more likely to be made up personas, and the user who is friends with made up personas may be more likely to be a made up persona. In yet another example, the total number of unique friends associated with the user may be compared with the total number of unique friends associated with the user's friends. If these two numbers are not close to each other (e.g., as determined by a ratio), this may indicate that the user's friends have many friends outside the user's social graph, and the user may be more likely to be a real person. If these two numbers are close to each other, this may indicate that the user's friends have few friends outside the user's social graph, and the user may be more likely to be a made up persona. In one implementation, weights associated with different types of links may be used in the analysis at 512 to determine how closely the user is linked with other users. In another embodiment, the user's social graph may also be analyzed to determine whether the user's account is associated with other users who have committed fraud and/or are associated with many potential fraud events. For example, if the user's friends have committed fraud and/or are associated with many potential fraud events, the user may be more likely to commit fraud as well. In one implementation, social graph data associated with the user and/or with the user's friends, may be retrieved for analysis from the Social Graph table group 1019b. In another implementation, social graph data may be retrieved by sending a request to a third party social network such as Facebook, MySpace, etc. (e.g. using a callback URL that includes the UID of the user or using the social network's API). In one implementation, the user's social graph data may be analyzed according to predetermined rules (e.g. rules following the examples discussed above) to calculate a score signifying the likelihood that the user's account may be used for fraud. For example, rules may be applied and a score for each applied rule may be calculated (e.g. 1=high likelihood and 0=low likelihood that the user's account may be used for fraud) and a weighted average (e.g. based on predetermined weights) may be calculated to determine the score signifying the likelihood that the user's account may be used for fraud based on social graph data.

In one embodiment, previous actual fraud and potential fraud events associated with the user may be analyzed at 514 to determine the likelihood that the user's account may be used for fraud. For example, if the user has previously committed fraud and/or if the user is associated with many potential fraud events, the user may be more likely to commit fraud. On the other hand, if the user has not previously committed fraud, and/or if the user is associated with few potential fraud events, the user may be less likely to commit fraud. In another example, the user's friends (e.g. based on the user's social graph) may be analyzed in a similar manner as in the above example. If the user's friends have previously committed fraud and/or are associated with many potential fraud events, the user may be more likely to commit fraud. On the other hand, if the user's friends have not previously committed fraud and/or are associated with few potential fraud events, the user may be less likely to commit fraud. In one implementation, data regarding previous actual fraud and/or potential fraud events associated with the user may be retrieved from the Fraud Event table group 1019d. In one implementation, data regarding previous actual fraud and/or potential fraud events associated with the user may be analyzed according to predetermined rules (e.g., rules following the examples discussed above) to calculate a score signifying the likelihood that the user's account may be used for fraud. For example, rules may be applied and a score for each applied rule may be calculated (e.g., 1=high likelihood and 0=low likelihood that the user's account may be used for fraud) and a weighted average (e.g. based on predetermined weights) may be calculated to determine the score signifying the likelihood that the user's account may be used for fraud based on data regarding previous actual fraud and/or potential fraud events associated with the user.

At 520, a potential fraud event threshold score for the user is calculated. The potential fraud event threshold score for the user may indicate a level of tolerance for transactions associated with the user that could be fraudulent before these transactions are flagged as potential fraud events. In one embodiment, the potential fraud event threshold score for the user is calculated based on user analysis 510. In one implementation, the potential fraud event threshold score for the user may be inversely proportional to the weighted average of the scores calculated in user analysis 510 (e.g., calculated as 1 divided by the weighted average, based on predetermined weights). For example, high scores signifying that the user is likely to commit fraud based on the user's social graph, and previous actual fraud and/or potential fraud events associated with the user, would result in a low potential fraud event threshold score for the user.

Information regarding and associated with the transaction is analyzed at 530. In one embodiment, the information may be analyzed to determine the likelihood of the transaction being fraudulent. In one implementation, the analysis may include analyzing the transaction with respect to predetermined rules 532, and/or analyzing the transaction with respect to the user's prior game play patterns 534, and/or analyzing the social graphs of transaction participants 536.

In one embodiment, the transaction may be analyzed at 532 to determine whether the transaction is likely to be fraudulent based on predetermined rules. In one implementation, this analysis may be performed based on the characteristics of the transaction. For example, if the transaction involves a user who places the majority of his or her virtual currency into the pot, the user may be trying to fraudulently transfer virtual currency to another user involved in the transaction. In another example, if the user is forcing a loss in a hand of poker, the user may be trying to fraudulently transfer virtual currency to another user involved in the transaction. In yet another example, suspicious transactions (e.g., as described in preceding examples) associated with the user may be counted (e.g., during the game session using a counter variable), and the higher the counter value, the more likely a suspicious transaction may be fraudulent. In one embodiment, transaction information may be determined by examining the transaction details data structure. In one implementation, transaction information may be analyzed according to predetermined rules (e.g., rules following the examples discussed above) to calculate a score signifying the likelihood that the transaction may be fraudulent. For example, rules may be applied and a score for each applied rule may be calculated (e.g., 1=high likelihood and 0=low likelihood that the transaction may be fraudulent) and a weighted average (e.g., based on predetermined weights) may be calculated to determine the score signifying the likelihood that the transaction may be fraudulent based on predetermined rules.

In one embodiment, the transaction may be analyzed at 534 to determine whether the transaction is likely to be fraudulent based on the user's prior game play patterns. For example, if the user typically bets no more than a certain amount of virtual currency, a transaction in which the user bets a much larger amount of virtual currency may be fraudulent. In another example, if the user typically plays with other users with a similar skill level, a transaction involving the user and other users with a much higher or lower skill level may indicate a fraudulent transaction. In one embodiment, information regarding the user's prior game play patterns may be retrieved from the User table group 1019a (e.g., using a SQL statement to retrieve information such as the average bet for the user). In one implementation, information regarding the user's prior game play patterns may be analyzed according to predetermined rules (e.g., rules following the examples discussed above) to calculate a score signifying the likelihood that the transaction may be fraudulent. For example, rules may be applied and a score for each applied rule may be calculated (e.g., 1=high likelihood and 0=low likelihood that the transaction may be fraudulent) and a weighted average (e.g. based on predetermined weights) may be calculated to determine the score signifying the likelihood that the transaction may be fraudulent based on the user's prior game play patterns.

In one embodiment, the transaction may be analyzed at 536 to determine whether the transaction is likely to be fraudulent based on the social graphs of the transaction participants. For example, if the transaction involves multiple users that are friends with each other and one user that is not friends with any of the other users, the transaction may be an attempt to defraud the friendless user. In another example, if the transaction involves multiple users with sparse social graphs that recently created accounts, the transaction may involve made up personas and may be fraudulent. In one implementation, social graph data of transaction participants may be retrieved for analysis from the Social Graph table group 1019b. In another implementation, social graph data may be retrieved by sending a request to a third party social network such as Facebook, MySpace, etc. (e.g., using a callback URL that includes the UIDs of the transaction participants or using the social network's API). In one implementation, the social graph data of transaction participants may be analyzed according to predetermined rules (e.g., rules following the examples discussed above) to calculate a score signifying the likelihood that the transaction may be fraudulent. For example, rules may be applied and a score for each applied rule may be calculated (e.g., 1=high likelihood and 0=low likelihood that the user's account may be used for fraud) and a weighted average (e.g., based on predetermined weights) may be calculated to determine the score signifying the likelihood that the transaction is fraudulent based on social graph data of transaction participants.

At 540, a transaction fraud score for the transaction is calculated. The transaction fraud score for the transaction may indicate a level of risk that the transaction may be fraudulent. In one embodiment, the transaction fraud score for the transaction is calculated based on transaction analysis 530. In one implementation, the transaction fraud score for the transaction may be a weighted average of the scores calculated in transaction analysis 530 (e.g., based on predetermined weights). For example, high scores signifying that the transaction is likely to be fraudulent based on predetermined transaction rules, the user's prior game play patterns, and the social graphs of the transaction participants, would result in a high transaction fraud score for the transaction.

At 550, the transaction fraud score for the transaction may be compared to the potential fraud event threshold score for the user (e.g., by comparing the two numbers). If the transaction fraud score for the transaction exceeds the potential fraud event threshold score for the user, the transaction may be recorded as a potential fraud event in the Fraud Event table group 1019d at 552, as described in more detail at 134. Otherwise, the transaction is not recorded as a potential fraud event 554.

Figure 7:
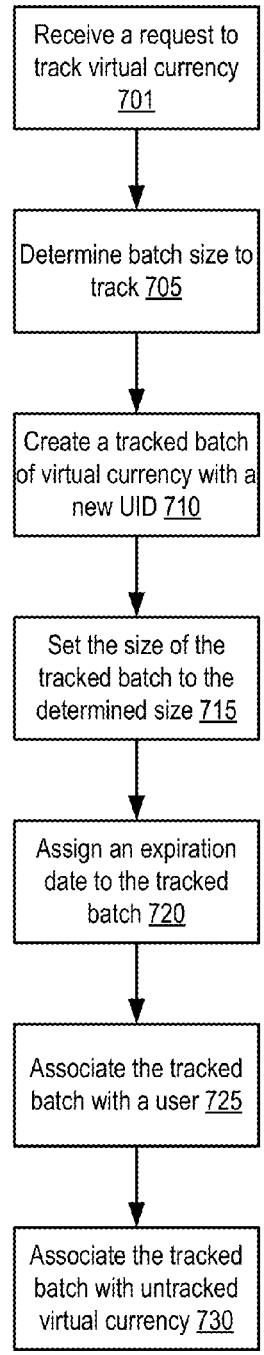
FIG. 7 is of a logic flow diagram illustrating a virtual currency tracking component in one embodiment of the TVC platform.

FIG. 7 is of a logic flow diagram illustrating a virtual currency tracking component in one embodiment of the TVC platform. In FIG. 7, a request to track virtual currency is received at 701. For example, if the user purchased virtual currency, a request may be received to track the purchased virtual currency. In another example, if a potential fraud event is detected and the virtual currency involved in the transaction is not currently being tracked, a request may be received to track the virtual currency involved.

In one embodiment, virtual currency may be tracked using tracked virtual currency. In one implementation, tagged and untagged virtual currencies may be used. Virtual currency visible to the user during game play may be untagged (e.g., a counter variable may be used to keep track of the untagged virtual currency associated with a user UID, in the User table group 1019a). Tagged shadow virtual currency (i.e., currency not visible to the user during game play) may be used to track a portion of the untagged virtual currency (e.g., a batch of tagged virtual currency may be associated with a user UID, a transaction UID, an amount of untagged virtual currency, and/or the like, in the User table group 1019a). In another implementation, any virtual currency may be tagged (e.g., see FIG. 1B). A portion (e.g. some or all) of the virtual currency involved in the transaction may be tagged (e.g., a batch of tagged virtual currency may be associated with a user UID, a transaction UID, and/or the like, in the User table group 1019a) to track the virtual currency. In one embodiment, transaction information used to track virtual currency may be determined by examining the transaction details data structure using PHP (e.g., $UserUID=$transactionDetails ["UserUID"]; $TransactionUID=$transactionDetails ["TransactionUID"]; $VCAmount=$transactionDetails ["VCAmount"];).

At 705, the batch size of the tracked virtual currency may be determined. In one embodiment, the batch size of the tracked virtual currency may be selected to balance the ability to detect fraud with the overhead of tracking virtual currency. For example, tracking all virtual currency may improve the ability to detect fraud, but tracking a small portion of the virtual currency may reduce storage space and processing power used to detect fraud. In one implementation, a preselected proportion (e.g., 10%) of the virtual currency involved in the transaction may be tracked. For example, if the user purchases 100 pieces of virtual currency, 10 pieces of virtual currency may be tracked. In another implementation, a random number of the virtual currency pieces involved in the transaction may be tracked. For example, if the user purchases 100 pieces of virtual currency a random percentage (e.g., from 5% to 25% corresponding to 5 to 25 pieces) of the purchased virtual currency may be tracked. In yet another implementation, the percentage of tracked virtual currency pieces may be user dependent. For example, if the user has previously committed fraud and/or is associated with many potential fraud events (e.g. based on data stored in the Fraud Event table group 1019*d*), a higher percentage of the virtual currency pieces involved in the transaction may be tracked than if the user is not associated with any fraud and/or potential fraud events.

In one embodiment, a batch of tracked virtual currency may be created at 710. In one implementation, the batch of tracked virtual currency may have a unique batch ID. In another implementation, each piece of tracked virtual currency may have a unique virtual currency ID. The size of the batch and/or the number of tracked virtual currency pieces may be set at 715 (e.g., equal to the size determined at 705). For example, the size of the batch may be set by updating the User table group 1019*a* using a SQL statement (e.g. UPDATE TrackedBatchesTable SET batch_size='the size determined at 705' WHERE UID='unique ID (UID) of the batch').

In one embodiment, an expiration date may be assigned to the batch of tracked virtual currency at 720. For example, if a batch of tracked virtual currency has not been used in any fraudulent or potentially fraudulent transactions after 1 month of tracking purchased virtual currency, the purchased virtual currency may be considered to have a low risk of being used fraudulently, and the batch may be removed from use. In one implementation, the expiration date may be specified as a date and/or time (e.g., Jan. 1, 2011 at 1:00 pm, number of milliseconds from a predetermined time, etc.). In another implementation, the expiration date may be specified as a period of time (e.g., 1 month, 15 days, etc.). For example, the expiration date of the batch may be set by updating the User table group 1019*a* using a SQL statement (e.g. UPDATE TrackedBatchesTable SET expiration_date='1/1/2011' WHERE UID='UID of the batch').

The batch of tracked virtual currency may be associated with the user who initiated the transaction at 725. For example, the user associated with the batch may be set by updating the User table group 1019*a* using a SQL statement (e.g. UPDATE TrackedBatchesTable SET user_UID='User's UID' WHERE UID='UID of the batch'). Associating a user with a batch of tracked virtual currency may facilitate tracking of virtual currency and/or analyzing the flow of virtual currency to detect fraud and/or potential fraud events. For example, a batch of tracked virtual currency may be associated with multiple users (e.g., as virtual currency is transferred between users), and the user_UID field may be used to distinguish which part of the batch is associated with which user.

In one embodiment, the batch of tracked virtual currency may be associated with untracked virtual currency (e.g., untagged virtual currency) at 730. In one implementation, the batch of tracked virtual currency may be associated with the amount of untracked virtual currency associated with the transaction. For example, the amount of untracked virtual currency associated with the batch of tracked virtual currency may be set by updating the User table group 1019*a* using a SQL statement (e.g., UPDATE TrackedBatchesTable SET VC_Amount='the amount of untracked virtual currency associated with the transaction' WHERE UID='UID of the batch'). In another implementation, the batch of tracked virtual currency may be associated with untracked virtual currency by updating the transaction details data structure using PHP (e.g., $transactionDetails["TrackedBatchUID"]='UID of the batch';).

Figure 8:
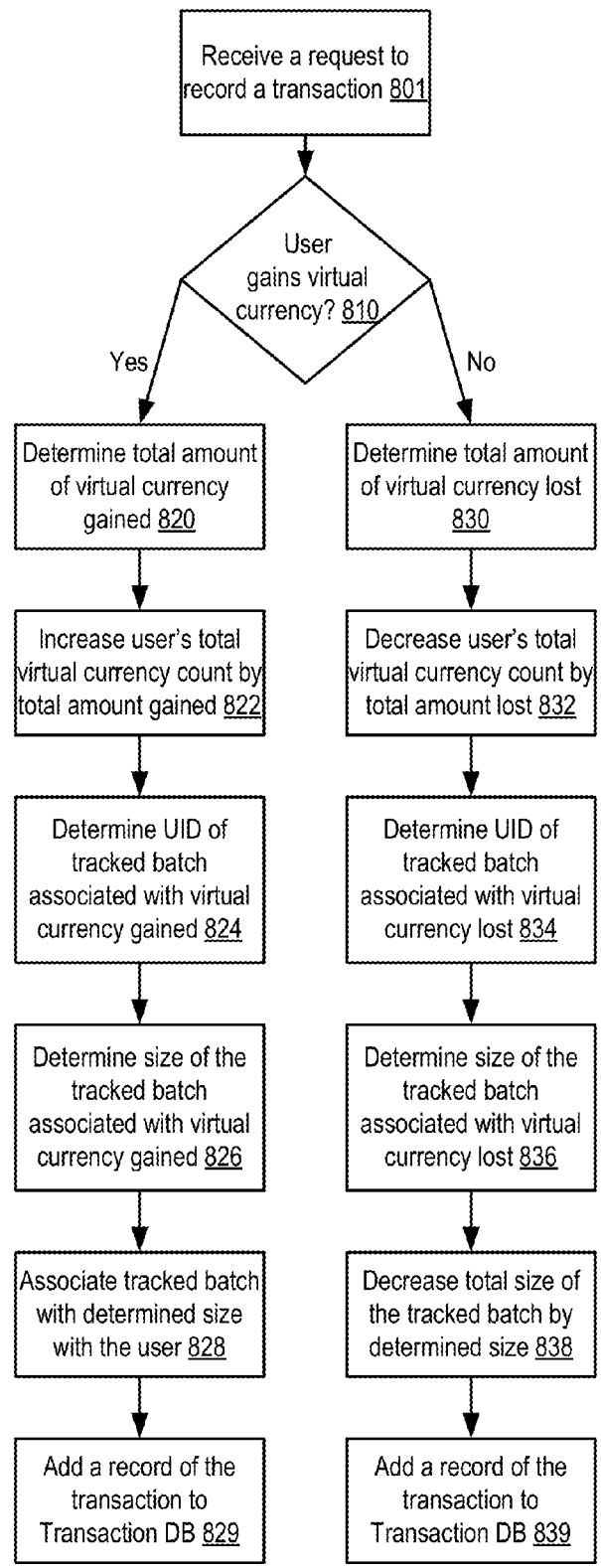
FIG. 8 is of a logic flow diagram illustrating a transaction recording component in one embodiment of the TVC platform.

FIG. 8 is of a logic flow diagram illustrating a transaction recording component in one embodiment of the TVC platform. In FIG. 8, a request to record a transaction is received at 801. In one embodiment, tracked virtual currency may be associated with the transaction. For example, the user may purchase virtual currency, and a batch of tracked virtual currency tracking the purchased virtual currency may be associated with the transaction. At 810, a determination may be made regarding whether the user gains and/or loses currency as a result of the transaction. For example, the user may win currency in a hand of poker. In another example, the user may gain one type of virtual currency and lose another type of virtual currency. In one embodiment, if multiple virtual currencies are associated with the transaction, the determination at 810 and subsequent actions may be repeated for each of the virtual currency types associated with the transaction. In one embodiment, the determination at 810 may be made based on transaction information (e.g. virtual currency amount of each type) by examining the transaction details data structure using PHP (e.g., $VCAmount1=$transactionDetails["VCType1"]["VCAmount"]; $VCAmount2=$transactionDetails["VCType2"]["VCAmount"];).

If the user gains virtual currency as a results of the transaction, the amount of virtual currency gained may be determined at 820 (e.g. by examining the transaction details data structure as described with regard to 810), and the amount of virtual currency associated with the user may be increased by the determined amount at 822. For example, the amount of virtual currency associated with the user may be set by updating the User table group 1019*a* using a SQL statement (e.g., UPDATE CurrencyTable SET VC_Amount=VC_Amount+ 'the amount of virtual currency determined at 820' WHERE user_UID='UID of the user'). In one embodiment, the UID of the tracked batch associated with the virtual currency gained may be determined at 824. For example, the UID of the batch of tracked virtual currency may be determined by examining the transaction details data structure using PHP (e.g., $trackedBatchUID=$transactionDetails["TrackedBatchUID"]). In one implementation, heuristics may be used to specify which virtual currency is gained. For example, when a user bets chips in a hand of poker, heuristics may specify that the chips that are bet are the chips that the user gained last, or the chips that the user gained first, or the chips that the user gained in the biggest (or smallest) transaction, or the chips that the user gained from a specified user, and/or the like. In one embodiment, the size of the batch of tracked virtual currency associated with virtual currency gained may be determined at 826. In one implementation, the size of the batch of tracked virtual currency associated with virtual currency gained may be selected based on the proportion of virtual currency that the user gained from another user (e.g., if the user gained 20% of virtual currency tracked by a batch of tracked virtual currency, the size of the batch of tracked virtual currency associated with the gained virtual currency may be 20% of the total). In another implementation, the size of the batch of tracked virtual currency associated with virtual currency gained may be selected to balance the ability to detect fraud with the overhead of tracking virtual currency as described in more detail at 705. In one embodiment, the batch of tracked virtual currency may be associated with the user at

828. For example, if the UID of the tracked batch is not currently associated with the user, the UID of the tracked batch may be associated with the user by updating the User table group 1019a using a SQL statement (e.g., INSERT INTO TrackedBatchesTable (UID, user_UID, batch_size) VALUES('UID of the batch', 'User's UID', 'the size determined at 826')). In another example, if the UID of the tracked batch is already associated with the user, the size of the tracked batch associated with the user may be increased by the size determined at 826. See 930 for additional details regarding consolidating batches of tracked virtual currency with the same UID into one batch. In one embodiment, a record of the transaction may be logged at 829. In one implementation, a record of the transaction may be added to the Transaction table group 1019c. For example, the record of the transaction may be added using a SQL statement (e.g. INSERT INTO TransactionsTable VALUES ('the values from the transaction details data structure')).

If the user loses virtual currency as a results of the transaction, the amount of virtual currency lost may be determined at 830 (e.g., by examining the transaction details data structure as described with regard to 810), and the amount of virtual currency associated with the user may be decreased by the determined amount at 832. For example, the amount of virtual currency associated with the user may be set by updating the User table group 1019a using a SQL statement (e.g., UPDATE CurrencyTable SET VC_Amount=VC_Amount–'the amount of virtual currency determined at 830' WHERE user_UID='UID of the user'). In one embodiment, the UID of the tracked batch associated with the virtual currency lost may be determined at 834. For example, the UID of the batch of tracked virtual currency may be determined by examining the transaction details data structure using PHP (e.g., $trackedBatchUID=$transactionDetails["TrackedBatchUID"]). In one implementation, heuristics may be used to specify which virtual currency is lost. For example, when the user bets chips in a hand of poker, heuristics may specify that the chips that are bet and lost are the chips that the user gained last, or the chips that the user gained first, or the chips that the user gained in the biggest (or smallest) transaction, or the chips that the user gained from a specified user, and/or the like. In one embodiment, the size of the batch of tracked virtual currency associated with virtual currency lost may be determined at 836. In one implementation, the size of the batch of tracked virtual currency associated with virtual currency lost may be selected based on the proportion of virtual currency that the user lost to another user (e.g., if the user lost 20% of virtual currency tracked by a batch of tracked virtual currency, the size of the batch of tracked virtual currency associated with the lost virtual currency may be 20% of the total). In another implementation, the size of the batch of tracked virtual currency associated with virtual currency lost may be selected to balance the ability to detect fraud with the overhead of tracking virtual currency as described in more detail at 705. In one embodiment, the size of the batch of tracked virtual currency associated with the user may be decreased at 838. For example, the size of the tracked batch associated with the user may be decreased by the size determined at 836 using a SQL statement (e.g. UPDATE TrackedBatchesTable SET batch_size=batch_size–'size of the batch of tracked virtual currency associated with virtual currency lost determined at 836' WHERE UID='UID of the batch' AND user_UID='UID of the user'). See 940 for additional details regarding removing batches of tracked virtual currency with a small size (e.g., 0). In one embodiment, a record of the transaction may be logged at 839. In one implementation, a record of the transaction may be added to the Transaction table group 1019c. For example, the record of the transaction may be added using a SQL statement (e.g. INSERT INTO TransactionsTable VALUES ('the values from the transaction details data structure')).

Figure 9:
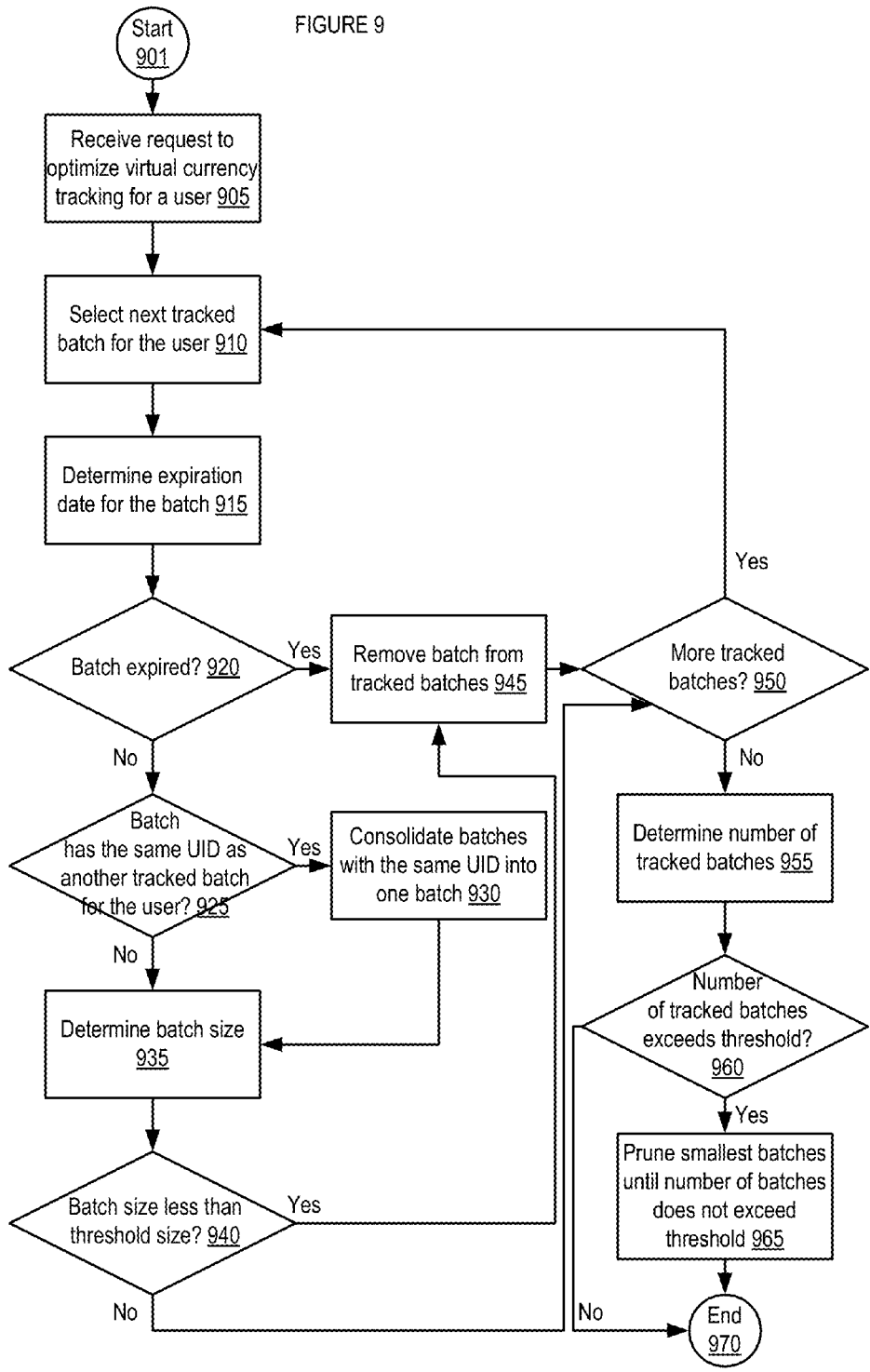
FIG. 9 is of a logic flow diagram illustrating a consolidation and pruning component in one embodiment of the TVC platform.

FIG. 9 is of a logic flow diagram illustrating a consolidation and pruning component in one embodiment of the TVC platform, and starts at 901. In FIG. 9, a request to optimize virtual currency tracking for a user is received at 905. For example, as transactions occur and currency is transferred among users, the number of tracked batches associated with a user may increase, sizes of some batches associated with the user may decrease, and some tracked batches may expire. Accordingly, some of the tracked batch may be consolidated and/or pruned (e.g., to conserve space and/or processing resources).

In one embodiment, a batch of tracked virtual currency associated with a user may be selected at 910. In one implementation, an array containing UIDs of the tracked batches associated with the user may be iterated through starting with the first element using PHP (e.g., the selected batch UID may be $batches_UIDs[0]). For example, the array may be populated with UIDs obtained from the User table group 1019a (e.g., SELECT UID FROM TrackedBatchesTable WHERE user_UID='User's UID').

The expiration date for the selected batch may be determined at 915. In one implementation, the expiration date of the batch may be determined by retrieving data from the User table group 1019a using a SQL statement (e.g. SELECT expiration_date FROM TrackedBatchesTable WHERE UID='UID of the selected batch' and user_UID='User's UID'). At 920, a determination may be made whether the selected batch has expired. In one implementation, the expiration date of the batch retrieved at 915 may be compared to the current date, and the batch may be deemed expired if the current date exceeds the expiration date (e.g., the expiration date is in the past).

In one embodiment, if the selected batch has expired, it may be removed from the batches of tracked virtual currency associated with a user at 945. In one implementation, the expired batch may be removed by deleting it from the User table group 1019a using a SQL statement (e.g., DELETE FROM TrackedBatchesTable WHERE UID='UID of the expired batch' AND user_UID='User's UID').

If the selected batch has not expired, a determination may be made at 925 regarding whether the selected batch has the same UID as another tracked batch associated with the user. For example, a user might have won some virtual currency tracked by the selected batch in a previous hand of poker and in the hand of poker associated with the current transaction. Accordingly, the selected batch, associated with the current transaction, may have the same UID as another tracked batch associated with the user as a result of winning the previous hand of poker. In one embodiment, if the selected batch has the same UID as another tracked batch associated with the user, the batches may be consolidated into one batch at 930. In various implementations, the size of the tracked batch associated with the user may be increased by the size of the selected batch using a SQL statement (e.g. UPDATE TrackedBatchesTable SET batch_size=batch_size+'size of the selected batch of tracked virtual currency' WHERE UID='UID of the selected batch' AND user_UID='UID of the user'), and the selected batch may be either removed from or not added to the User table group 1019a depending on implementation.

At 935, the size of the selected batch may be determined (e.g., by examining the batch_size field of the TrackedBatchesTable in the User table group 1019a). In one embodiment, a determination may be made at 940 whether the size of the selected batch is less than a threshold size (e.g. 0). In one implementation, the threshold size may be predetermined (e.g., stored in a configuration file or hardcoded). In another implementation, the threshold size may be dynamically calculated based on a metric (e.g., threshold size=average tracked batch size for all users−1 standard deviation).

In one embodiment, if the size of the selected batch is less than a threshold size, it may be removed from the batches of tracked virtual currency associated with a user at 945. In one implementation, the selected batch may be removed by deleting it from the User table group 1019*a* using a SQL statement (e.g. DELETE FROM TrackedBatchesTable WHERE UID='UID of the selected batch' AND user_UID='User's UID').

If a determination is made at 950 that there are further batches of tracked virtual currency associated with the user (e.g., the current batch UID is not the last element in the $batches_UIDs array containing UIDs), the next tracked batch associated with the user may be selected at 910 and analyzed as described. Otherwise, the number of tracked batches associated with the user may be determined at 955. In one implementation, the number of tracked batches may be determined using a SQL statement (e.g. SELECT COUNT (DISTINCT UID) FROM TrackedBatchesTable WHERE user_UID='User's UID').

In one embodiment, a determination may be made at 960 whether the number of tracked batches associated with the user exceeds a threshold size (e.g., 10). In one implementation, the threshold size may be predetermined (e.g., stored in a configuration file or hardcoded). In another implementation, the threshold size may be dynamically calculated based on a metric (e.g., threshold size=average number of tracked batches for all users+1 standard deviation).

If the number of tracked batches associated with the user exceeds a threshold size, some of the batches are pruned at 965 so that the number of tracked batches does not exceed a threshold. In one implementation, the smallest batches associated with the user (as measured by batch_size), may be pruned (e.g., deleted from the TrackedBatchesTable). The consolidation and pruning component ends at 970.

TVC Controller

Figure 10:
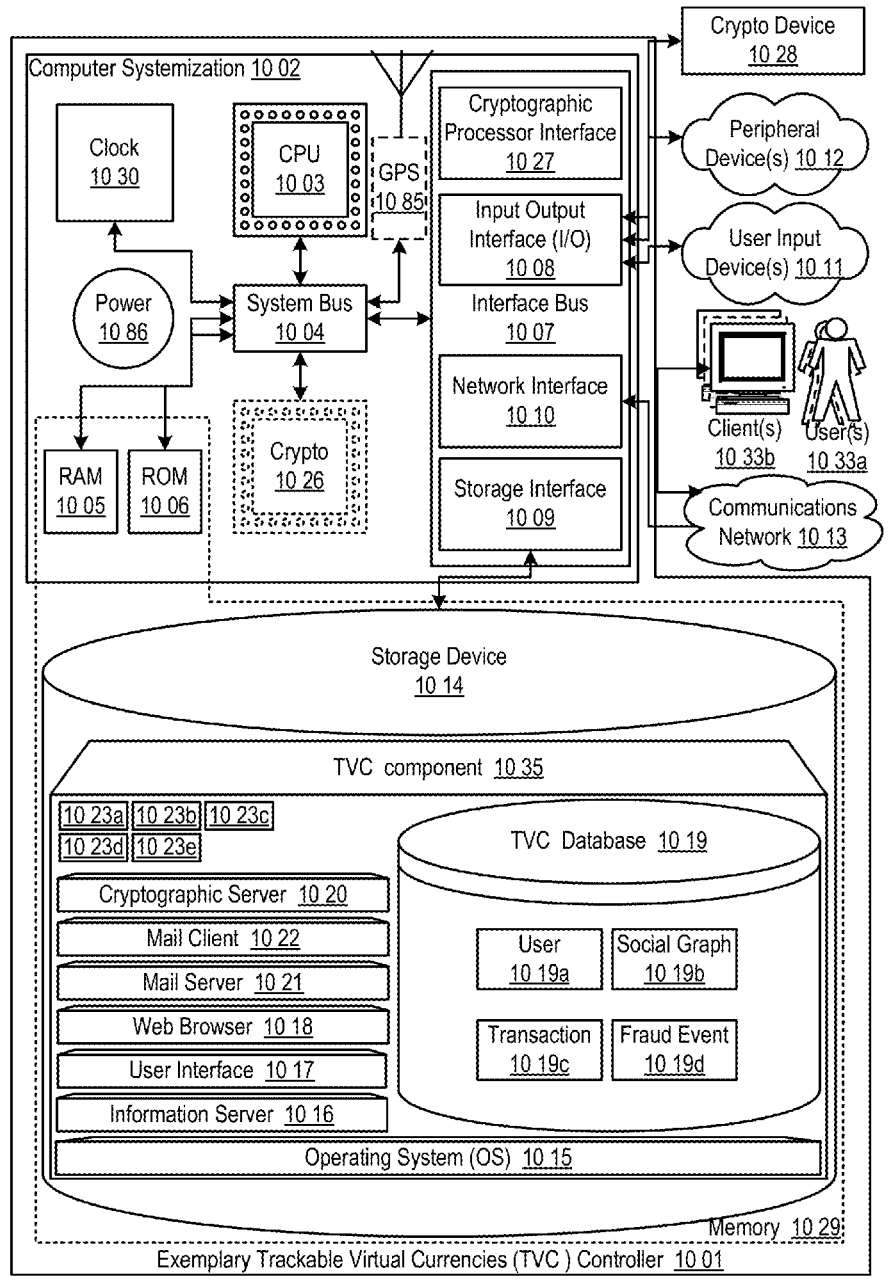
FIG. 10 is of a block diagram illustrating embodiments of the TVC platform controller.

FIG. 10 illustrates inventive aspects of a TVC controller 1001 in a block diagram. In this embodiment, the TVC controller 1001 may serve to aggregate, process, store, search, serve, identify, instruct, generate, match, and/or facilitate interactions with a computer through a variety of information technologies, and/or other related data.

Typically, users, which may be people and/or other systems, may engage information technology systems (e.g., computers) to facilitate information processing. In turn, computers employ processors to process information; such processors 1003 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1029 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the TVC controller 1001 may be connected to and/or communicate with entities such as, but not limited to: one or more users from user input devices 1011; peripheral devices 1012; an optional cryptographic processor device 1028; and/or a communications network 1013.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The TVC controller 1001 may be based on computer systems that may comprise, but are not limited to, components such as: a computer systemization 1002 connected to memory 1029.

Computer Systemization

A computer systemization 1002 may comprise a clock 1030, central processing unit ("CPU(s)" and/or "processor(s)" (these terms are used interchangeable throughout the disclosure unless noted to the contrary)) 1003, a memory 1029 (e.g., a read only memory (ROM) 1006, a random access memory (RAM) 1005, etc.), and/or an interface bus 1007, and most frequently, although not necessarily, are all interconnected and/or communicating through a system bus 1004 on one or more (mother)board(s) 1002 having conductive and/or otherwise transportive circuit pathways through which instructions (e.g., binary encoded signals) may travel to effect communications, operations, storage, etc. Optionally, the computer systemization may be connected to an internal power source 1086. Optionally, a cryptographic processor 1026 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the TVC controller and beyond through various interfaces. Should processing requirements dictate a greater amount speed and/or capacity, distributed processors (e.g., Distributed TVC), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the TVC may be achieved by implementing a microcontroller such as CAST's R8051XC2 microcontroller; Intel's MCS 51 (i.e., 8051 microcontroller); and/or the like. Also, to implement certain features of the TVC, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the TVC component collection (distributed or otherwise) and/or features may be implemented via the microprocessor and/or via embedded components; e.g., via ASIC, coprocessor, DSP, FPGA, and/or the like. Alternately, some implementations of the TVC may be implemented with embedded components that are configured and used to achieve a variety of features or signal processing.

Depending on the particular implementation, the embedded components may include software solutions, hardware solutions, and/or some combination of both hardware/software solutions. For example, TVC features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the TVC features. A hierarchy of programmable interconnects allow logic blocks to be interconnected as needed by the TVC system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the TVC may be developed on regular FPGAs and then migrated into a fixed version that more resembles ASIC implementations. Alternate or coordinating implementations may migrate TVC controller features to a final ASIC instead of or in addition to FPGAs. Depending on the implementation all of the aforementioned embedded components and microprocessors may be considered the "CPU" and/or "processor" for the TVC.

Power Source

The power source 1086 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1086 is connected to at least one of the interconnected subsequent components of the TVC thereby providing an electric current to all subsequent components. In one example, the power source 1086 is connected to the system bus component 1004. In an alternative embodiment, an outside power source 1086 is provided through a connection across the I/O 1008 interface. For example, a USB and/or IEEE 1394 connection carries both data and power across the connection and is therefore a suitable source of power.

Interface Adapters

Interface bus(ses) 1007 may accept, connect, and/or communicate to a number of interface adapters, conventionally although not necessarily in the form of adapter cards, such as but not limited to: input output interfaces (I/O) 1008, storage interfaces 1009, network interfaces 1010, and/or the like. Optionally, cryptographic processor interfaces 1027 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1009 may accept, communicate, and/or connect to a number of storage devices such as, but not limited to: storage devices 1014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1010 may accept, communicate, and/or connect to a communications network 1013. Through a communications network 1013, the TVC controller is accessible through remote clients 1033b (e.g., computers with web browsers) by users 1033a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed TVC), architectures may similarly be employed to pool, load balance, and/or otherwise increase the communicative bandwidth required by the TVC controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1010 may be used to engage with various communications network types 1013. For example, multiple network interfaces may be employed to allow for the communication over broadcast, multicast, and/or unicast networks.

Input Output interfaces (I/O) 1008 may accept, communicate, and/or connect to user input devices 1011, peripheral devices 1012, cryptographic processor devices 1028, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1011 may be card readers, dongles, finger print readers, gloves, graphics tablets, joysticks, keyboards, mouse (mice), remote controls, retina readers, trackballs, trackpads, and/or the like.

Peripheral devices 1012 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the TVC controller may be embodied as an embedded, dedicated, and/or monitor-less (i.e., headless) device, wherein access would be provided over a network interface connection.

Cryptographic units such as, but not limited to, microcontrollers, processors 1026, interfaces 1027, and/or devices 1028 may be attached, and/or communicate with the TVC controller. A MC68HC 16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1029. However, memory is a fungible technology and resource, thus, any number of memory embodiments may be employed in lieu of or in concert with one another. It is to be understood that the TVC controller and/or a computer systemization may employ various forms of memory 1029. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1029 will include ROM 1006, RAM 1005, and a storage device 1014. A storage device 1014 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1029 may contain a collection of program and/or database components and/or data such as, but not limited to: operating system component(s) 1015 (operating system); information server component(s) 1016 (information server); user interface component(s) 1017 (user interface); Web browser component(s) 1018 (Web browser); database(s) 1019; mail server component(s) 1021; mail client component(s) 1022; cryptographic server component(s) 1020 (cryptographic server); the TVC component(s) 1035; and/or the like (i.e., collectively a component collection). These components may be stored and accessed from the storage devices and/or from storage devices accessible through an interface bus. Although non-conventional program components such as those in the component collection, typically, are stored in a local storage device 1014, they may also be loaded and/or stored in memory such as: peripheral devices, RAM, remote storage facilities through a communications network, ROM, various forms of memory, and/or the like.

Operating System

The operating system component 1015 is an executable program component facilitating the operation of the TVC controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the TVC controller to communicate with other entities through a communications network 1013. Various communication protocols may be used by the TVC controller as a subcarrier transport mechanism for interaction, such as, but not limited to: multicast, TCP/IP, UDP, unicast, and/or the like.

Information Server

An information server component 1016 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the TVC controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the TVC database 1019, operating systems, other program components, user interfaces, Web browsers, and/or the like.

Access to the TVC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the TVC. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the TVC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1017 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1018 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the TVC enabled nodes. The combined application may be nugatory on systems employing standard Web browsers.

Mail Server

A mail server component 1021 is a stored program component that is executed by a CPU 1003. The mail server may be a conventional Internet mail server such as, but not limited to sendmail, Microsoft Exchange, and/or the like. The mail server may allow for the execution of program components through facilities such as ASP, ActiveX, (ANSI) (Objective–) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the TVC.

Access to the TVC mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1022 is a stored program component that is executed by a CPU 1003. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1020 is a stored program component that is executed by a CPU 1003, cryptographic processor 1026, cryptographic processor interface 1027, cryptographic processor device 1028, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the TVC may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the TVC component to engage in secure transactions if so desired. The cryptographic component facilitates the secure accessing of resources on the TVC and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The TVC Database

The TVC database component 1019 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the TVC database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the TVC database is implemented as a data-structure, the use of the TVC database 1019 may be integrated into another component such as the TVC component 1035. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1019 includes several tables 1019*a-d*. A User table group 1019*a* includes fields such as, but not limited to: a user_UID, VCType, VCAmount, and/or the like. The User table group may support and/or track multiple entity accounts on a TVC. A Social Graph table group 1019*b* includes fields such as, but not limited to: a user_UID, FriendsCount, and/or the like. The Social Graph table group may support and/or track social graph data on a TVC. A Transaction table group 1019*c* includes fields such as, but not limited to: a user_UID, transaction_UID, and/or the like. The Transaction table group may support and/or track transactions on a TVC. A Fraud Event table group 1019*d* includes fields such as, but not limited to: a FraudEventUID, TrackedCurrencyBatchUID, and/or the like. The Fraud Event table group may support and/or track fraud determination on a TVC.

In one embodiment, the TVC database may interact with other database systems. For example, employing a distributed database system, queries and data access by search TVC component may treat the combination of the TVC database, an integrated data security layer database as a single database entity.

In one embodiment, user programs may contain various user interface primitives, which may serve to update the TVC. Also, various accounts may require custom database tables depending upon the environments and the types of clients the TVC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1019*a-d*. The TVC may be configured to keep track of various settings, inputs, and parameters via database controllers.

The TVC database may communicate to and/or with other components in a component collection, including itself, and/or facilities of the like. Most frequently, the TVC database communicates with the TVC component, other program components, and/or the like. The database may contain, retain, and provide information regarding other nodes and data.

The TVCs

The TVC component 1035 is a stored program component that is executed by a CPU. In one embodiment, the TVC component incorporates any and/or all combinations of the aspects of the TVC that was discussed in the previous figures. As such, the TVC affects accessing, obtaining and the provision of information, services, transactions, and/or the like across various communications networks.

The TVC component may transform user transaction request input via various TVC components into transaction result output, and/or the like and enables use of the TVC. In one embodiment, the TVC component 1035 takes inputs (e.g., user transaction request 320, transaction information 601, previous fraud and potential fraud events 605, prior game play patterns 607, social graph information 610, and/or the like), and transforms the inputs via various components (e.g., VCP 1023a, PFED 1023b, VCT 1023c, TR 1023d, CAP 1023e, and/or the like), into outputs (e.g., transaction request 322, transaction analysis request 324, request for prior game play patterns 326, response with prior game play patterns 328, request for social graph data 330, response with social graph data 332, fraud events and virtual currency tracking data 334, transaction analysis response 336, virtual currency data 338, transaction response 340, transaction result output 342, potential fraud event determination 630, and/or the like), as shown in the figures and throughout the specification.

The TVC component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the TVC server employs a cryptographic server to encrypt and decrypt communications. The TVC component may communicate to and/or with other components in a component collection, including itself, and/or facilities of the like. Most frequently, the TVC component communicates with the TVC database, operating systems, other program components, and/or the like. The TVC may contain, communicate, generate, obtain, and/or provide program component, system, user, and/or data communications, requests, and/or responses.

Distributed TVCs

The structure and/or operation of any of the TVC node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the TVC controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter application communication or within memory spaces of a singular component for intra application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

$w3c$–post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment. The following resources may be used to provide example embodiments regarding SOAP parser implementation:
http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm
and other parser implementations:
http://publib.boulder.ibm.com/infocenter/tivihelp/v2r1/index.jsp?topic=/com.ibm12.IBMDI.doc/referenceguide259.htm
all of which are hereby expressly incorporated by reference.

In order to address various issues and advance the art, the entirety of this application for APPARATUSES, METHODS AND SYSTEMS FOR A TRACKABLE VIRTUAL CURRENCIES PLATFORM (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed invention(s) may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a TVC individual and/or enterprise user, database configuration and/or relational model, data type, data transmission and/or network framework, syntax structure, and/or the like, various embodiments of the TVC, may be implemented that enable a great deal of flexibility and customization. For example, aspects of the TVC may be adapted for non-game use. While various embodiments and discussions of the TVC have been directed to fraud detection in games, however, it is to be understood that the embodiments described herein may be readily configured and/or customized for a wide variety of other applications and/or implementations.

What is claimed is:

1. A fraud detection method implemented by a processor, the method comprising:
receiving a fraud alert, the fraud alert initiated by a user and detected by a system executing the method;
investigating the fraud alert by analyzing social graph of the user associated with the fraud alert to determine likelihood of the user being involved in fraud;
when it is determined that the user was involved in the fraud based on the analysis,
reversing a chain of fraudulent transactions related to the fraud;
updating fraud events data related to the fraud into a fraud event database for subsequent analysis,
wherein analyzing further includes examining information obtained from the social graph of the user associated with the fraud alert to determine if the user submitted a false claim, the examining includes,
determining different types of links between the user associated with the fraud alert and other users in the social graph, each type of link accorded a distinct weight; and
examining the weights associated with each of the different types of links to determine level of linkage of the user with the other users in the social graph, the type of links and level of linkage between the user and the other users in the social graph used in determining if a false claim was submitted by the user through the fraud alert,
wherein the method operations are performed by the processor.

2. The method of claim 1, wherein investigating further includes retrieving the social graph related to the user from a social graph table for analysis.

3. The method of claim 1, wherein investigating further includes retrieving the social graph related to the user from one or more social media networks for analysis.

4. The method of claim 1, wherein analyzing further includes,
examining information obtained from the social graph of the user associated with the fraud alert according to predetermined rules;

calculating a fraud score corresponding to each predetermined rule for the user;

assigning a predetermined weight for each calculated fraud score associated with the user based on a weight accorded to the respective predetermined rules;

computing a weighted average of the fraud scores associated with the user using the calculated fraud scores;

comparing the weighted average of the fraud score associated with the user against a predetermined threshold value; and establishing that a fraud was committed when the weighted average for the user exceeds the predetermined threshold value.

5. The method of claim 1, wherein reversing a chain of fraudulent transactions related to the fraud further includes, retrieving information from a transaction table related to the fraudulent transactions, the information identifying one or more transaction entries generated for the fraudulent transactions;

retrieving information from a user table related to the users involved in the fraudulent transactions; and reversing the one or more transaction entries related to the users involved in the fraudulent transactions upon successful verification that the fraud was committed, the reversing results in restoring virtual currency of one or more defrauded users.

6. The method of claim 1, wherein investigating the fraud alert further includes monitoring transactions of the user associated with the fraud alert using a set of trackable virtual currency, the trackable virtual currency encoded with an unique identifier to aid in monitoring progression of the trackable virtual currency through a transaction system.

7. The method of claim 6, wherein reversing a chain of fraudulent transactions related to the fraud further includes, examining transaction details associated with the fraudulent transactions to determine amount of virtual currency associated with one or more defrauded users that are involved in the fraudulent transactions and amount of trackable virtual currency transferred from one or more defrauded users to one or more of other users; and restoring the amount of virtual currency involved in the fraudulent transactions to the one or more defrauded users using new virtual currency upon successful verification that the fraud was committed.

8. The method of claim 7, further includes removing the trackable virtual currency from circulation.

9. A fraud detection method implemented by a processor, the method comprising:

receiving a fraud alert;

investigating the fraud alert by analyzing social graph of a user associated with the fraud alert to determine likelihood of the user being involved in fraud;

when it is determined that the user was involved in the fraud based on the analysis, reversing a chain of fraudulent transactions related to the fraud; and updating fraud events data related to the fraud into a fraud event database for subsequent analysis, wherein reversing a chain of fraudulent transactions related to the fraud further includes, determining amount of virtual currency associated with one or more defrauded users that are involved in the fraudulent transactions, the amount of virtual currency involved in the fraudulent transactions determined using a set of virtual currency that are configured for tracking, the set of virtual currency that can be tracked being encoded with unique identifier to aid in monitoring progression of the tracked virtual currency through an online game system; and restoring the amount of virtual currency involved in the fraudulent transactions to the one or more defrauded users using new virtual currency, upon successful verification that the fraud was committed, wherein the method operations are performed by the processor.

10. The method of claim 9, further includes removing the tracked virtual currency from circulation.

11. The method of claim 9, wherein updating fraud event database further includes updating the fraud event associated with the fraud alert within the fraud event database to reflect the fraud alert was associated with actual fraud or the fraud alert was a false alarm, wherein updating fraud event for the actual fraud includes recording information related to the fraud transaction including information related to the users involved in the fraud transaction, in the fraud event database.

12. A system for detecting fraud in an online gaming application, comprising:

a memory; and a processor disposed in communication with the memory and configured to execute processing instructions stored in the memory, wherein the processing instructions are configured to:

receive a fraud alert;

investigate the fraud alert by analyzing social graph of a user associated with the fraud alert within a social network to determine likelihood of the user being involved in fraud, the user's social graph providing information related to the user's behavior toward other users, type of social link and level of association defined by the social link between the user and the one or more of the other users of the user's social graph that were previously associated with potential fraud events, wherein the processing instructions for analysis includes processing instructions to examine information obtained from the social graph of the user associated with the fraud alert to determine if the user submitted a false claim, the examination is further configured to determine different types of social links between the user associated with the fraud alert and other users in the social graph, each type of social link accorded a distinct weight;

examine the weights associated with each of the different types of social links to determine level of linkage of the user with the other users in the social graph, the type of social links and level of linkage between the user and the other users in the social graph used in determining if a false claim was submitted by the user through the fraud alert;

when it is determined that the user was involved in the fraud event based on the analysis, the processing instructions are further configured to, reverse a chain of fraudulent transactions related to the fraud;

update fraud events data related to the fraud into a fraud event database for subsequent analysis; and notify, the one or more of the other users associated with the fraud, a status of their respective user accounts in response to the reversing.

13. The system of claim 12, wherein processing instructions to analyze social graph is further configured to,
- examine information from the social graph of the user associated with the fraud alert, according to predetermined rules;
- calculate a fraud score corresponding to each predetermined rule for the user;
- assign a predetermined weight for each calculated fraud score associated with the user based on a weight accorded to the respective predetermined rules;
- compute a weighted average of the fraud scores associated with the user using the calculated fraud scores;
- compare the weighted average of the fraud score associated with the user against a predetermined threshold value; and
- establish that a fraud was committed when the weighted average for the user exceeds the predetermined threshold value.

14. The system of claim 12, wherein processing instructions to reverse a chain of fraudulent transactions related to the fraud is further configured to,
- retrieve information from a transaction table related to the fraudulent transactions, the information identifying one or more transaction entries generated for the fraudulent transactions;
- retrieve information from a user table related to the users of the user accounts involved in the fraudulent transactions; and
- reverse the one or more transaction entries related to the users involved in the fraudulent transactions upon successful verification that the fraud was committed, the reversing results in restoring virtual currency of one or more defrauded users.

15. A system for detecting fraud in an online gaming application, comprising:
- a memory; and
- a processor disposed in communication with the memory and configured to execute processing instructions stored in the memory, wherein the processing instructions are configured to:
  - receive a fraud alert, the fraud alert identifying a user associated with a fraud event that triggered the fraud alert;
  - investigate the fraud alert by analyzing social graph of a social network of the user associated with the fraud alert to determine likelihood of the user being involved in fraud, the social graph providing information related to the user's behavior toward other users in the user's social graph, type of social link and level of association defined by the social link between the user and the one or more of the other users of the user's social graph that were previously associated with potential fraud events;
  - when it is determined that the user was involved in the fraud event based on the analysis, the processing instructions are further configured to,
  - reverse a chain of fraudulent transactions related to the fraud;
  - update fraud events data related to the fraud into a fraud event database for subsequent analysis; and
- notify, the one or more of the other users associated with the fraud, a status of their respective user accounts in response to the reversing,
  - wherein processing instructions to reverse a chain of fraudulent transactions related to the fraud is further configured to,
  - determine amount of virtual currency associated with one or more defrauded users that are involved in the fraudulent transactions, the amount of virtual currency involved in the fraudulent transactions determined using a set of virtual currency that are configured for tracking, the set of virtual currency that can be tracked being encoded with unique identifier to aid in monitoring progression of the tracked virtual currency through an online game system; and
  - restore the amount of virtual currency involved in the fraudulent transactions to the one or more defrauded users using new virtual currency upon successful verification that the fraud was committed.

* * * * *